US011861866B2

United States Patent
McClellan et al.

(10) Patent No.: US 11,861,866 B2
(45) Date of Patent: *Jan. 2, 2024

(54) AUTOMATIC REGION OF INTEREST DETECTION FOR CASINO TABLES

(71) Applicant: visualimits, llc, Henerson, NV (US)

(72) Inventors: Ryan McClellan, Grosse Pointe, MI (US); Brett Tinling, Edmonds, WA (US); Robin Groenevelt, Roquefort les Pins (FR)

(73) Assignee: Visualimits, LLC, Henderson, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/712,468

(22) Filed: Apr. 4, 2022

(65) Prior Publication Data
US 2022/0230355 A1 Jul. 21, 2022

Related U.S. Application Data

(63) Continuation of application No. 16/845,391, filed on Apr. 10, 2020, now Pat. No. 11,308,642, which is a continuation of application No. 15/482,697, filed on Apr. 7, 2017, now Pat. No. 10,650,550, which is a continuation-in-part of application No. 15/475,040, filed on Mar. 30, 2017, now Pat. No. 10,217,312.

(60) Provisional application No. 62/482,686, filed on Apr. 6, 2017, provisional application No. 62/481,675, filed on Apr. 4, 2017.

(51) Int. Cl.
*G07F 17/32* (2006.01)
*G06T 7/73* (2017.01)
*G06T 7/80* (2017.01)

(52) U.S. Cl.
CPC .............. *G06T 7/74* (2017.01); *G06T 7/80* (2017.01); *G07F 17/322* (2013.01); *G07F 17/3241* (2013.01)

(58) Field of Classification Search
CPC . G06T 7/74; G06T 7/80; G07F 17/322; G07F 17/3241
See application file for complete search history.

(56) References Cited

U.S. PATENT DOCUMENTS

| | | | |
|---|---|---|---|
| 10,650,550 B1 * | 5/2020 | McClellan | G07F 17/322 |
| 11,308,642 B2 * | 4/2022 | McClellan | G07F 17/3241 |
| 2005/0026680 A1 * | 2/2005 | Gururajan | G07F 17/32 463/25 |
| 2005/0272501 A1 * | 12/2005 | Tran | G07F 17/3241 463/29 |

(Continued)

*Primary Examiner* — Dmitry Suhol
*Assistant Examiner* — Carl V Larsen
(74) *Attorney, Agent, or Firm* — Frost Brown Todd LLP

(57) ABSTRACT

A method, system, and computer readable storage for identifying regions of interest on a casino gaming table. Regions of interest are locations on an image where relevant actions are typically going to occur. For example, locations of betting area region of interest and card area regions of interest are determined so that these areas can be analyzed on a video camera. The analyzed areas can then be used for things such as determining and tracking player betting amounts, determining if the game is being dealt properly (by analyzing the cards dealt to determine if the proper cards are dealt and/or the proper payouts are made).

20 Claims, 20 Drawing Sheets

(56) References Cited

U.S. PATENT DOCUMENTS

| | | | | |
|---|---|---|---|---|
| 2007/0015583 A1* | 1/2007 | Tran | ............... | G07F 17/32 |
| | | | | 463/40 |
| 2007/0077987 A1* | 4/2007 | Gururajan | ............. | G07F 17/322 |
| | | | | 463/22 |
| 2008/0303210 A1* | 12/2008 | Grauzer | ............. | G07F 17/3225 |
| | | | | 273/149 R |
| 2009/0265105 A1* | 10/2009 | Davis | ............... | G07F 17/32 |
| | | | | 348/113 |
| 2010/0087241 A1* | 4/2010 | Nguyen | ............. | G07F 17/3227 |
| | | | | 463/17 |
| 2012/0106831 A1* | 5/2012 | Hsu | ............... | G06V 20/00 |
| | | | | 382/154 |
| 2014/0217178 A1* | 8/2014 | Zhou | ............... | G06K 7/1447 |
| | | | | 235/454 |

\* cited by examiner

CHOOSE LAYOUT

AUTOMATIC REGION OF INTEREST DETECTION FOR CASINO TABLES

CROSS REFERENCE TO RELATED APPLICATIONS

This application is a continuation of U.S. non-provisional application Ser. No. 16/845,391, which is a continuation of U.S. non-provisional application Ser. No. 15/482,697, which claims benefit to U.S. provisional applications 62/481,675 and 62/482,686, both of which are incorporated by reference herein in their entireties. U.S. non-provisional application Ser. No. 15/482,697 is a continuation in part of U.S. non-provisional application Ser. No. 15/475,040, which claims benefit to U.S. provisional application 62/315,621, both of which are incorporated by reference herein in their entireties.

BACKGROUND OF THE INVENTION

Field of the Invention

The present general inventive concept is directed to a method, apparatus, and computer readable storage medium directed to automatically detecting regions of interest on casino tables.

Description of the Related Art

Casino players make wagers (also referred to as bets) which are typically tracked electronically by computers. Players who make larger bets are provided with more incentives to continue playing.

It is desirable for computers to be able to automatically track amounts that players are wagering as well as the cards dealt in casino games like blackjack and other games. This can help with determining the value of players as well as help identify cheating or dealer errors.

SUMMARY OF THE INVENTION

It is an aspect of the present invention to provide an improved system to process images of casino tables.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1:
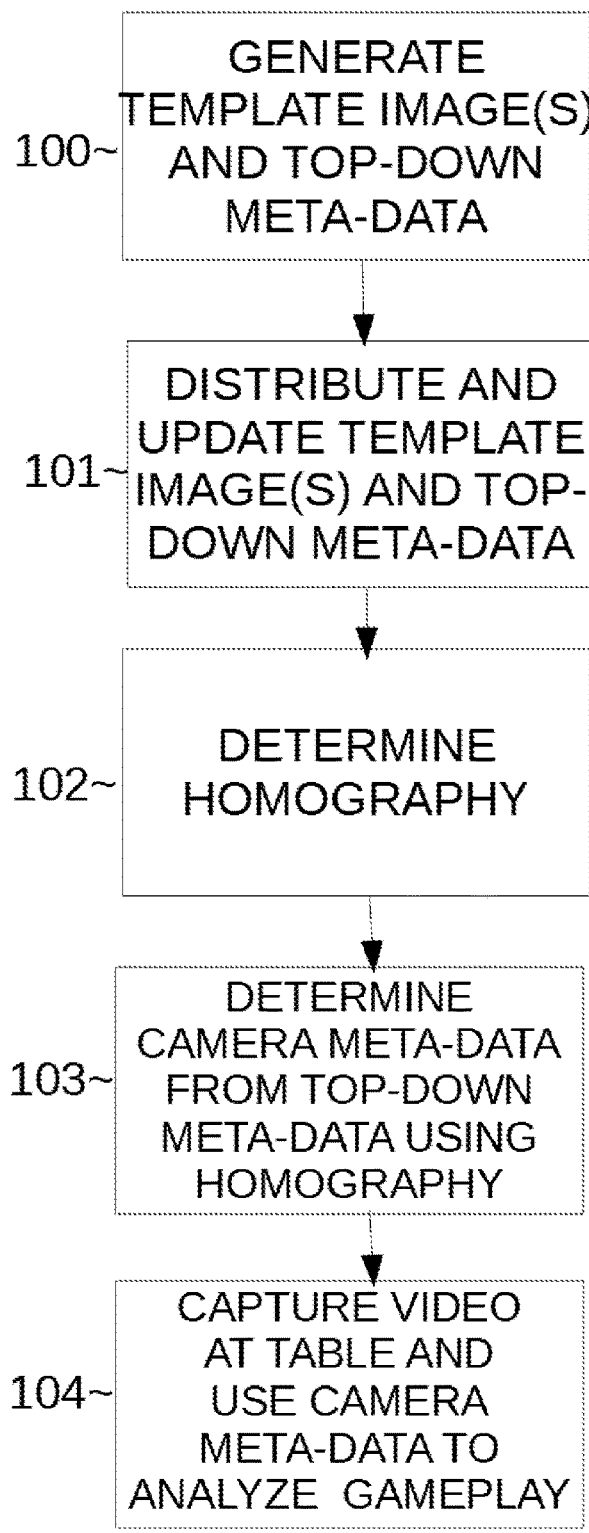
FIG. 1 is flowchart illustrating an exemplary method of identifying and utilizing regions of interest on a casino table.

Reference will now be made in detail to the presently preferred embodiments of the invention, examples of which are illustrated in the accompanying drawings, wherein like reference numerals refer to like elements throughout.

The present inventive concept relates to a method, system and computer readable storage which can identify regions of interest on a casino table for a camera or a plurality of cameras pointing on the table. A region of interest (ROI) is a particular subset (area) of the table in which relevant things might happen so this area should be observed and analyzed. For example, one type of region of interest are the betting area regions of interest (typically where the betting circles area) where players place their chips (betting area regions of interest). An automated casino table monitoring system would want to determine how much each player bets on each hand (e.g., on a hand of blackjack although it can be applied to any game) so the betting circles need to be observed. Another region of interest is the card areas where cards are dealt (each player has a respective card area and the dealer has a respective card area where the dealer's cards are dealt). Card areas should be observed so that cards dealt in the card area can be recognized for their value so the game can be monitored (card area regions of interest). In this way, an automated computer can follow along with the game and determine if the game is being dealt properly (e.g., if there are dealer errors) and if players are being paid properly. Note that side bets betting circles (areas on the table where the players make their side bets) are also considered a separate type of region of interest (side bet area regions of interest). The system can also determine the number of players at the table (based on observation/analysis of the betting regions of interest and/or the card area regions of interest) and the dealer performance which can be measured as basic hands per hour (based on observation/analysis of the betting regions of interest and/or the card regions of interest). Typically, for every betting area there is a side betting area (thus for every betting area region of interest there is a corresponding side bet region of interest). Regions of interest can also be used to simply detect the absence and presence of a chip (in a betting area) or a card (in a card area) to determine dealer efficiency (e.g., hands/hour) and utilization of the table. All of this information can be stored in any database. "Table" and "casino table" are used synonymously herein, unless another meaning for "table" is clearly evident.

The general method operates as follows. A template image is generated from a table layout (which is an image of the table felt placed on the table itself in which the game is dealt on). The template image is then "painted" with different colors representing different regions of interest (the painting can be done manually using a paint program or automatically using region detection). These regions of interest represent where relevant activity will happen on the table (so these regions of interest can be analyzed to track play of the game). A computer file ("top-down meta-data") is generated which quantitatively defines the regions of interest (e.g., as ellipses although other shapes can be used as well). A camera on a table which has the same layout the template image was generated from is used to detect some of the regions of interest. For example, chips can be placed on betting regions of interest and an image of the chips on the table can be subtracted from an image of an empty table thereby identifying where the chips (betting regions of interest) are on the camera image of the table. There are two frames of reference, the template image (which is top down) and the camera image (which is typically taken from the side). Now that real world objects (chips) are detected in regions of interest that we can identify on the template (stored in the top-down meta-data as the betting regions of interest), the homography has been determined. The homography is a mapping of one frame of reference to the other.

Now all of the regions of interest in the top-down meta-data can be transformed to regions of interest in the camera image by applying the homography to the regions of interest in the top-down meta-data. A file referred to as the camera meta-data stores all of the transformed regions of interest from the top-down meta-data. Each camera pointed on the table would have its own homography and hence its own camera meta-data file. In this way, images from the cameras ("camera" as used herein refers to a video camera) can be analyzed at regions corresponding to the regions of interest defined in the camera meta-data file to be table to track progress of the game (e.g., to track how much in chips each player is betting etc.)

The system can start with a layout. A layout is an image of the table felt that can be provided by a variety of sources (e.g., a distributor of the table game, a casino, a felt manufacturer, etc.) and can be an electronic (digital) file (e.g., a JPG or any other such format). The table felt (also referred to as table layout) has betting circles (where players place their bets in chips) and other indicia/markings on it. The layouts can be distributed electronically (e.g., emailed, web, etc.) to an administrator. The administrator is the party that is administering the system. The layout is typically photographed or drawn from the top down (e.g., an aerial view). "Layout" as used herein refers to a file which contains an image of a table's layout (felt) or it can also refer to the actual felt placed on a physical table (depending on the context how it is used). Each different casino table game (e.g., blackjack, baccarat, etc.) has its own table layout, although some games (e.g., blackjack) may have many different layouts. Note that each casino would typically have their own custom layouts that have their casino name printed on them (and hence their own custom templates).

FIG. 1 is flowchart illustrating an exemplary method of identifying and utilizing regions of interest on a casino table. This is a very high level introduction to the system described herein.

In operation 100, template images and top-down meta-data are generated from the layout (file). Template images are images made from the layout (and show the respective table layout) and may be refined to meet particular standards (e.g., be a certain resolution, etc.) Top-down meta-data is data (e.g., a file) that describes regions of interest on a template image. For example, on the template image there may be seven betting circles, the top-down meta-data is data which identifies where on the template image the seven betting circles are located (defined geometrically such as by ellipses) and what type each region of interest is (e.g., a betting area region of interest). This can be done as described herein. "Top-down meta-data" can also be referred to as template meta-data.

From operation 100, the method proceeds to operation 101, which distributes and updates the template image(s) and respective top-down meta-data to all tables across different casinos that are utilizing the current system. Periodically, updated (e.g., improved) versions of temple images and their respective top-down meta-data may be generated and these updated versions are electronically distributed to casinos and delivered to the individual hardware at each respective casino table which may need the updated versions. Note that while updated templates (and hence their top-down meta-data) are distributed automatically, only updated templates and meta-data that are used by a particular casino would need to be distributed to that casino. For example, casinos typically have their own templates for each game, so if casino's A template (and/or its top-down meta-data) for a particular game was updated by the administrator but not casino B's template (and/or its top-down meta-data), then the update would automatically only go to casino A but not casino B. This can be done as described herein. Note that as used herein, "template" is synonymous with "template image."

From operation 101, the method proceeds to operation 102, which determines the homography. At casino tables one or more cameras can be mounted at various locations on the table (or on the ceiling, on a pole, etc.) and these camera angles are different than the angle that the top-down templates were taken at. The camera meta-data identifies where the regions of interest are (the same regions of interest identified in the top-down meta-data) in the images taken by the cameras at the table. Since the cameras at the table use a different angle, the locations of the regions of interest taken therein will of course be different than the location (coordinates) of the regions of interest from the template. Thus, cameras at each casino table can be trained/initialized. Homography is a mapping of points defining the regions of interest from the top-down meta-data to the camera meta-data, although in an embodiment the points used in the homography (e.g., the file containing the homography) do not have to correspond to regions of interest but can be arbitrary (or selected) points. The regions of interest identified in the top-down meta-data can be identified from the cameras using techniques such as placing physical objects (e.g., a chip) on the table in the respective regions of interest so that it can be identified where the regions of interest from the top-down meta-data exist in the camera views (which would be stored in the camera meta-data). This can be done as described herein.

From operation 102, the method proceeds to operation 103, which determines camera meta-data from the top-down meta-data using the homography. This transforms other regions of interest identified in the top-down meta-data to the respective camera view. For example, once the homography (mapping from the template image to the camera image) is known, then other regions of interest identified in the top-down meta-data can then be translated (using open source computer vision functions such as in OpenCV) to their camera image counterparts. Thus, any point and/or region of interest identified in the top-down meta-data can be located (transformed to) on each camera image using the homography. Each camera (there typically would be a plurality of cameras on each casino table) would have its own homography (mapping from its own image to the template image).

So in other words, some regions of interest from the point of view from the cameras are determined physically which then determines the mapping (homography) between the template (top-down image) and the table camera views (camera images). Once the mapping is known, then any other regions of interest identified from the template (in the top-down meta-data) can then be converted to the camera meta-data mathematically (or in a more complex method, combining these mathematical transformations along with using visual images of the (empty) table layout as captured by the camera to better match the template image to the camera image in order to get a more accurate transformation).

From operation 103, the method proceeds to operation 104, which captures video (or a still image or images) at the table using the cameras at the table. A still image (or multiple images) of the table can be processed as described herein. All images and video captured by each camera can be transmitted to any other server/computer on the system and can be stored by any such server/computer on the system. As such, the image(s) and video captured at each table can all be stored on a server (any server on the system) for later review/retrieval/use by the system for any purpose. The regions of interest (identified by the camera meta-data) are then analyzed and utilized to analyze the game-play. For example, the regions of interest which are betting circles are observed for the placement of chips so the computer system can identify how many chips are bet by each player on a hand/game. In this manner, a database can be maintained of each player and how much the player has bet on each hand (players can be identified when they sit down by presenting their player's card to the casino personnel as known in the art). Each player has his/her own betting circle (and hence their own betting area region of interest) and thus each the amount of bets (wagers) in each betting circle would be attributed to the player sitting at that particular spot. The regions of interest which are card areas are observed so that the cards dealt therein are analyzed so that the flow of the game is determined and any errors in the dealing of the game (or cheating) are flagged by the system. Note that in addition to card games, the system described herein can be applied to other types of games as well, such as dice (e.g., craps, Sic Bo, etc.), wheel (roulette, etc.), etc. Instead of a card region of interest, the region of interest would be a dice region of interest or a wheel region of interest, for a dice or wheel game, respectively. For example, the area of a table where the dice are rolled in the game of Sic Bo would be a dice region of interest, and the activity in this region of interest would be analyzed to determine (and store) the dice rolls, etc. On a roulette game, the wheel region of interest would be where the roulette wheel is so that this region can be analyzed so that the winning number on each spin can be determined and stored. As with the card regions of interest, any other regions of interest (e.g., wheel, dice, etc.) can be manually painted (identified) on the template image as to where the wheel actually will be located (or where the dice will be rolled). In all games (e.g., blackjack, dice, wheel, etc.) there can be all types of betting regions (for example in wheel games there would also be betting regions of interest (like as described herein with respect to blackjack) to track the player's bets in additional to the wheel region of interest).

In this manner, activity on the casino table can be tracked and analyzed by the computer system to determine things like efficiency of the dealer (e.g., the dealer's error rate, dealer hands per hour, time required for shuffles, number of players at the table, etc.), the betting rate of individual players, the identification of cheating, etc. For example, players who bet above a certain amount may be entitled to complimentaries from the casino.

The method would start with a layout that can be provided by a variety of sources, for example a distributor of a table game, the casino, etc. The layout can simply be an image (e.g., a photograph or a scan) of the table layout. From this layout, the method in FIG. 2 would result in template images and top-down meta-data. Template images are similar to the layout but modified to be in a standard format for the system (e.g., a particular resolution, size, etc.) Top-down meta-data is data which can be in any form (e.g., XML, etc.) which defines regions of interest on the respective template. Note that a vendor that provides the layout would not provide any of the meta-data (e.g., top-down meta-data), it would be up to the administrator to receive the layout and to identify (either electronically or manually) where the regions of interest are and produce color codes template images identifying these regions of interest.

Figure 2:
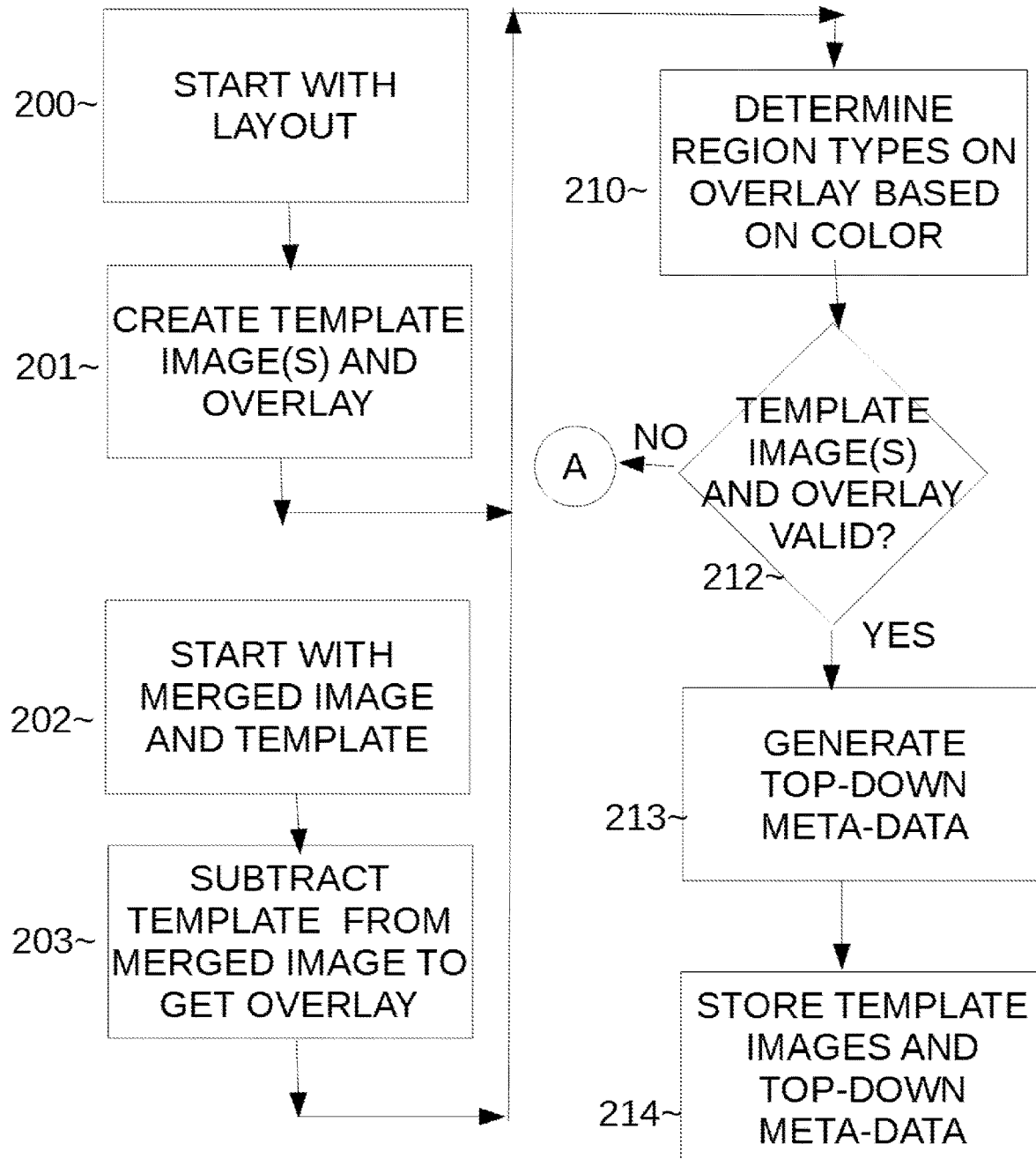
FIG. 2 is a flowchart illustrating an exemplary method of generating templates and top-down meta-data.

FIG. 2 is a flowchart illustrating an exemplary method of generating templates and top-down meta-data. The method illustrated in FIG. 2 is performed by the administrator of the method.

Figure 3:
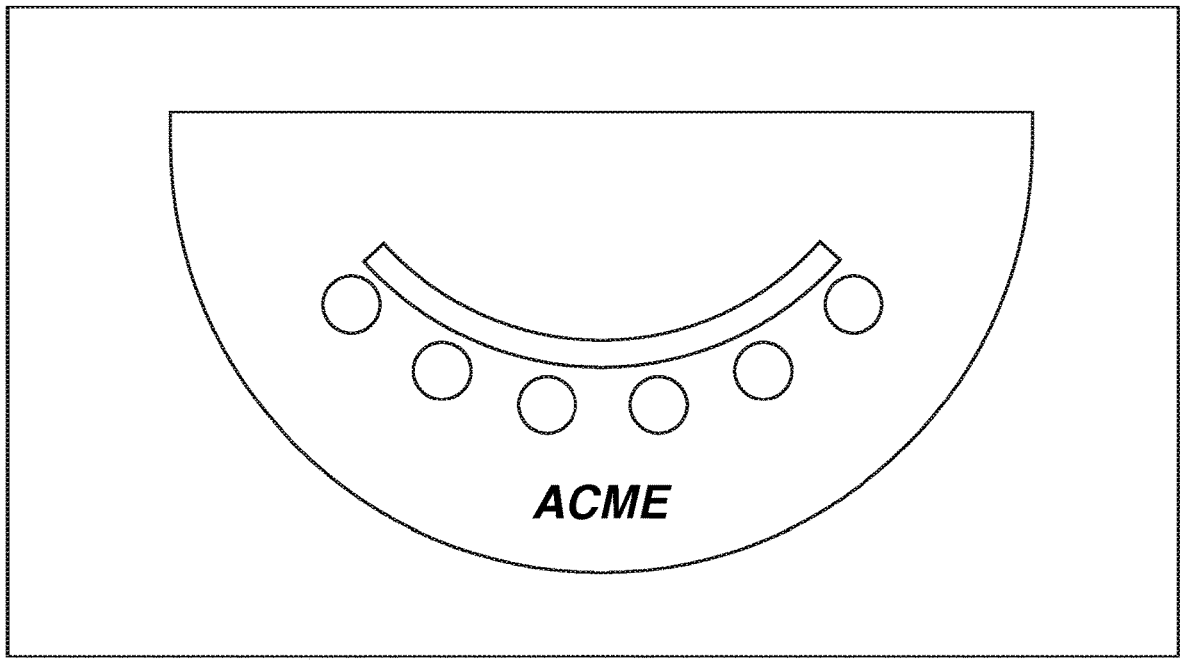
FIG. 3 is drawing illustrating a layout of a table felt, according to an embodiment.

The method begins by starting with a layout (an image of a table felt which has all of the indicia for a particular game). The layout can be emailed to the administrator or delivered via electronic means (e.g., internet, etc.) An example of a layout is illustrated in FIG. 3.

Figure 4:
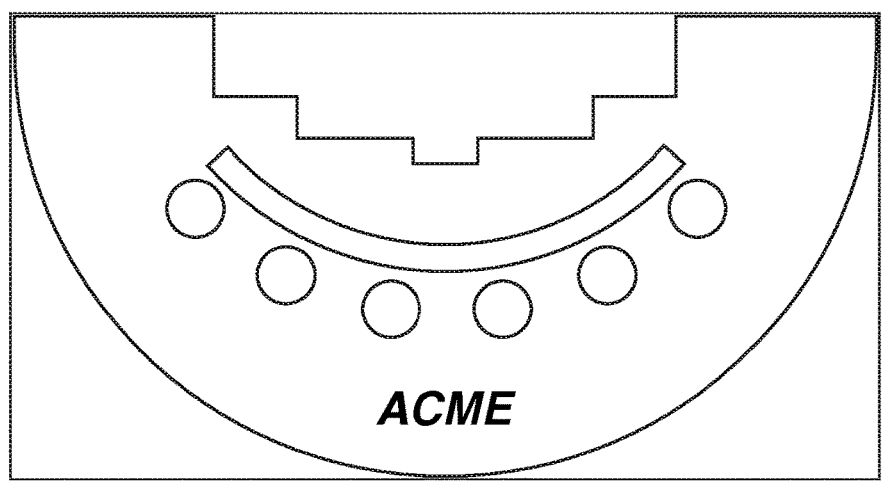
FIG. 4 is a drawing illustrating a template generated from the layout from FIG. 3, according to an embodiment.

From operation 200, the method proceeds to operation 201, which creates a template image (or images) from the layout. Template images are the layout but transformed to a particular format. For example, all template images should typically be a particular size, resolution, etc., in order to be consistent and operate properly with the rest of the system. An example of a template image is illustrated in FIG. 4. This is similar to the layout in FIG. 3 although an area is cut out on top where the dealer's chip tray would be. The dimensions of the template image may differ from the layout as well (the layout may need to be resized in order for it to become a template image).

Figure 5:
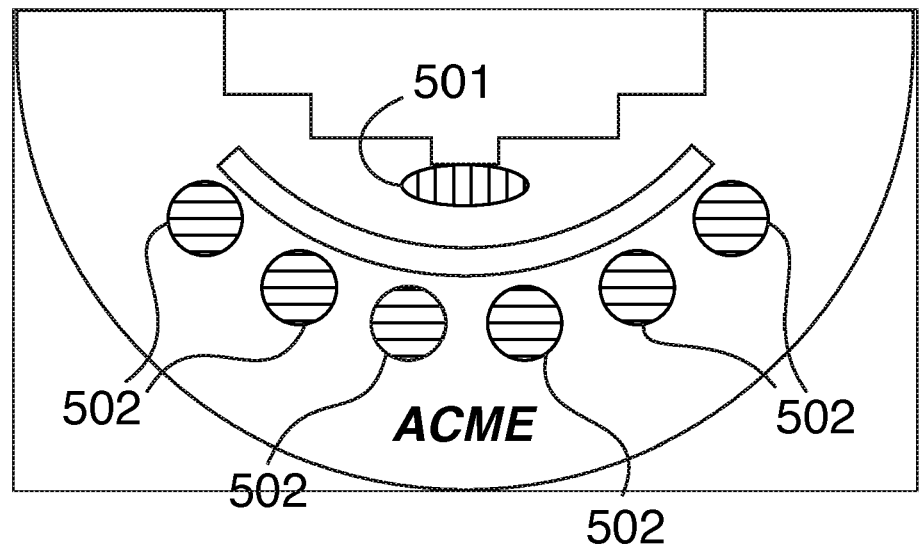
FIG. 5 is a drawing illustrating the template illustrated in FIG. 4 with regions of interest filled in, according to an embodiment.
Figure 6:
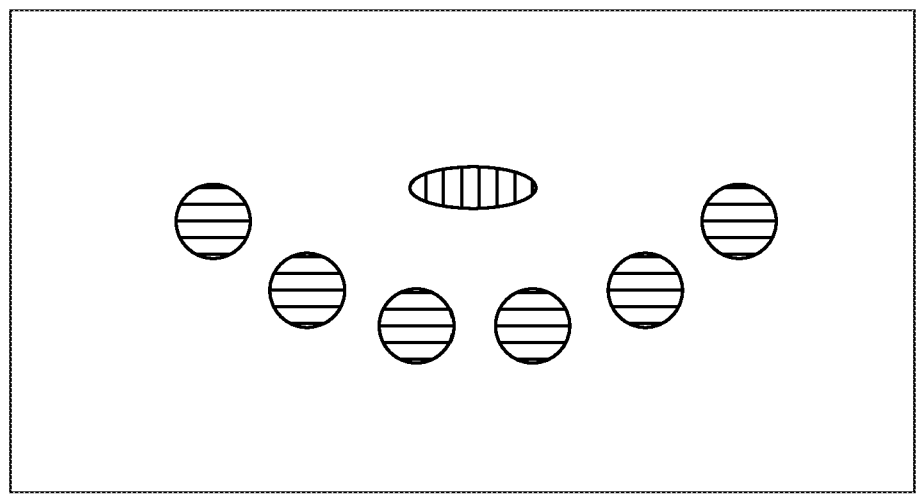
FIG. 6 is a drawing illustrating an overlay with regions of interest used for the template illustrated in FIG. 4, according to an embodiment.

An overlay is also created. An overlay is another layer that fits on top of the template and identifies each region of interest. Different regions of interest can be denoted by different colors. For example, betting circles can be one color (e.g., red), the dealer's area can be a different color (e.g., green), etc. The overlay can be created manually by painting in the regions of interest with the respective color. For example, a card region of interest can be painted by a technician in an area where he/she expects cards to be dealt. Betting area regions are typically where the betting circles are. The overlay can also be created automatically by using pattern recognition to recognize the betting areas and the dealer areas and paint them different colors. FIG. 6 shows an example of an overlay which shows six betting areas (in one color) and the dealer's area on top (in another color). Note that the overlay (FIG. 6) can fit onto the template image (FIG. 4) in order to create a merged image (FIG. 5). A merged image is a single image which has the template and the overlay merged together (note the white parts of the overlay can be considered a "transparent" color). In an embodiment, one unique color is used for each type of ROI (card, bet, side bet), and the system uses geometry to detect which is the first position and which is the last. In another embodiment, a different color could be used for each different region of interest (even of the same type), for example different betting circles would all be different colors. There are multiple regions of interest on the table of the same type (e.g., multiple betting areas, multiple card areas) because each casino table allows for multiple players to play simultaneously, although there may be only one dealer card area region of interest since there is only one dealer.

Once the template image(s) and the overlay are created, the method can proceed to operation 210.

In another embodiment, the method can alternatively start at operation 202 instead of operation 200. In operation 202, the method already starts with a merged image (merging an overlay with the regions of interest with the template into a single image). A merged image (see FIG. 5) can be obtained by merging the template with the overlay, or by painting the regions of interest directly onto the template image. Thus, if the method is starting at operation 202, it already has a merged image which (if the regions of interest are not directly painted onto the template) already has the overlay determined and merged with the template (the overlay that is merged can be determined as described in operation 201).

If a template image is not provided, the template image can be generated from the layout as described in operation 201.

From operation 202, the method proceeds to operation 203, which subtracts the template image from the merged image resulting in the overlay itself (see FIG. 6). If the system only has the layout but not a template image, then a template image can be created from the layout (as described in operation 201).

In this manner, an overlay and a template image are obtained to proceed to operation 210. Thus, note that if the system starts without a merged image then it can begin from operation 200 and if the system already has a merged image than it can begin from operation 202. Ultimately, in order to proceed to operation 210 the system should have a template image (also referred to as template) and an overlay showing the regions of interest.

Thus, from operation 201 or operation 203, the method proceeds to operation 210, which can automatically determine the region types of the overlay based on their color. For example, betting circles for main bets can be a particular color (e.g., red), a dealer's area for the dealer's cards can be different color (e.g., green), side bet betting circles for side bets (also known as side bets) can be a different color (e.g., blue), etc. The different regions of interest can be automatically numbered (for example see FIG. 7 which numbered all six betting areas (betting circles) as 1b, 2b, 3b, 4b, 5b and 6b, and the dealer's area is labeled 0c. This numbering can also be done manually as well.

From operation 210, the method proceeds to operation 212 which determines whether the template image (or images of there are more than one) and the overlay are both valid. This can be done according to a set of rules, as an example: 1) A template and overlay would only be valid if there are zero unknown regions. An unknown region is an area on the overlay with a color that does not match the color coding scheme. If there are any unknown regions, then the template and overlay would not be valid. 2) A template and overlay would only be valid if there are an appropriate number of card spots (card regions or card areas) and bet spots (e.g., for betting circles). If there is not an appropriate number of card spots and/or betting circles then the template and overlay are invalid. In some games, the number of card spots must equal the number of bet spots plus one for standard table games which deal cards to the dealer (this is because there must be a card spot for the dealer but the dealer does not make a bet). Depending on the game, template validation rules can be developed for that particular game (associated with the template) so that there are an appropriate number of betting regions and card regions. Alternatively, instead of game-specific validation, general validation rules can be predetermined for all templates.

If in operation 212, there is a template and overlay error (not valid) then the method would return to either operation 100 or 102 to try again. In this case, it is up to the technician (working for the administrator) to try again (perhaps adjusting the template image) and retry. Only if the template and overlay are found valid (validated) in operation 212 then would the method proceed to operation 213.

In operation 213, top-down meta-data is generated. Top-down meta-data is meta-data which defines the regions of interest on the template. The top-down meta-data can be automatically generated from the overlay. For example, Table I below contains example top-down meta-data for a template. It defines the regions of interest (where to find the regions of interest on the template). For example, betting circle '1b' (see FIG. 7) is defined as an ellipse with its center at coordinates "x=709.600647, y=203.087341, a width of the ellipse=71.76033, a height of the ellipse being 73.81597, and an angle of the ellipse being 266.7249. Thus, each region of interest on the template image is defined by a region in the template image by the top-down meta-data). Each region of interest is stored along with its name. The top-down meta-data can be generated by analyzing the different colored regions (on the overlay or on the template image itself) and fitting an ellipse to each region of interest (circles are ellipses with width=height). If regions of interest do not exactly fit an ellipse, then the closest ellipse to that region of interest will be approximated. Ellipses can be fitted to the regions of interest defined in the template image using techniques known in the art, such as OpenCV function fitEllipse (which inputs points on the perimeter of the region and output parameters of the closest fitted ellipse, the parameters being for example centerX, centerY, angle (rotation in degrees), width (in pixels), height (in pixels), BoundingRect (points on a rectangle bounding the ellipse). A top-down meta-data can be populated with all of the data defining each of the ellipses which define each region of interest along with a name for the respective region of interest, a type of the region of interest (e.g., betting, card, etc.) and any other data relating to that region of interest. In addition, the top-down meta-data file (like the camera meta-data file) can have other fields of well (not specific to each region of interest), such as the game name the file applies to, and any other fields that can be used by the system whether described herein or not.

In Table I, other fields can include Id (identifier for the template), VLGameTypeId (global (meaning shared by all casinos) game Identifier), VLSideBetId (global side bet identifier), VLSideBetName (global side bet name), VLGameTypeName (global game name), TemplateEmptyData (top down image in png format, base 64 encoded), DetectedROIsJson (JSON text containing a list of the regions of interest (ROI) from the top down perspective), Id: ROI Identifier, Num (Position number (0 for dealer, 1-N for player positions)), Name (Mnemonic for region. includes position number and ROI type (c: Cards, b: Bets, s: SideBets)), Rect (bounding rectangle around the ellipse) Ellipse (geometric description of the ellipse from top-down perspective (center[x,y], angle, size[width,height])), Type: (ROI type (Unknown=0, Cards=1, Bet=2, Side=3, Control=4)), DetectedROIsChecksum (MD5 hash of the DetectedROIsJson used for determining when the template has changed), Seats (num positions/seats detected)

TABLE I

```
{
  "Id": "6b018990-7152-43dc-a2ec-1c5503418a3d",
  "VLGameTypeId": "c28c8936-11c2-4089-9c7b-50297375977f",
  "VLSideBetId": null,
  "VLGameTypeName": "Blackjack",
  "VLSideBetName": null,
  "Name": "acme",
  "TemplateEmptyData": "data:image/png;base64,iVBORw0KGgoAAAANSUhEUgAA
  ... ARnQU1BAACxjwv8YQUAAAAJcEhZcwAADsMAA+==",
  "DetectedROIsJson": "[
    {
      "_Id": "7025d4c3-ac8e-4f99-90e3-84f998708ea5",
      "_Num":0,
      "_Name":"0c",
      "_CamName":"",
      "_Ellipse":{
        "_CenterX":451.421722,
        "_CenterY": 170.1532,
        "_Angle": 180.289276,
        "_Width":42.01747,
        "_Height": 125.646286,
        "_BoundingRect":"388, 149, 126, 42"
      },
      "_Type":1
    },
    {
      "_Id":"7caf1bc0-5e14-4575-a1b0-f7c29e62167e",
      "_Num":5,
      "_Name":"5b",
      "_CamName":"",
      "_Ellipse":{
        "_CenterX":282.9637,
        "_CenterY":268.8289,
        "_Angle":266.818359,
        "_Width":71.4518661,
        "_Height":71.70112,
        "_BoundingRect":"245, 231, 76, 76"
      },
      "_Type":2
    },
    {
      "_Id": b3f619a6-c220-42fd-83ac-ae658f22d8fa"
      "_Num":1,
      "_Name":"1b",
      "_CamName":"",
      "_Ellipse":{
        "_CenterX":709.600647,
        "_CenterY":203.087341,
        "_Angle":266.7249,
        "_Width":71.76033,
```

TABLE I-continued

```
      "_Height":73.81597,
      "_BoundingRect":"672, 164, 76, 78"
    },
    "_Type":2
  },
  {
    "_Id":"5c1e936b-2176-4175-88f2-71424a752763",
    "_Num":6,
    "_Name":"6b",
    "_CamName":"",
    "_Ellipse":{
      "_CenterX":191.684448,
      "_CenterY":202.718628,
      "_Angle": 184.044617,
      "_Width":71.98778,
      "_Height":72.3741455,
      "_BoundingRect":"153, 164, 77, 77"
    },
    "_Type":2
  },
  {
    "_Id":"4be7b680-f975-40b2-af2d-b357564a24d0",
    "_Num":3,
    "_Name":"3b",
    "_CamName":"",
    "_Ellipse":{
      "_CenterX":507.2059,
      "_CenterY":304.739624,
      "_Angle": 174.947662,
      "_Width":75.48305,
      "_Height":76.14297,
      "_BoundingRect":"466, 264, 82, 82"
    },
    "_Type":2
  },
  {
    "_Id":"b85600ce-7f07-4c97-a246-b098cfa3d05c",
    "_Num":4,
    "_Name":"4b",
    "_CamName":"",
    "_Ellipse":{
      "_CenterX":393.2059,
      "_CenterY":304.739624,
      "_Angle":174.947662,
      "_Width":75.48305,
      "_Height":76.14297,
      "_BoundingRect":"352, 264, 82, 82"
    },
    "_Type":2
  },
  {
    "_Id":"b8c6ce0e-cd93-4b42-a20f-ac15f6b611b5",
    "_Num":2,
    "_Name":"2b",
    "_CamName":"",
    "_Ellipse":{
      "_CenterX":618.205933,
      "_CenterY":269.739624,
      "_Angle":174.947662,
      "_Width":75.48305,
      "_Height":76.14297,
      "_BoundingRect":"577, 229, 82, 82"
    },
    "_Type":2
  }
],
"DetectedROIsChecksum": "8f8141294c88691009aa99aaa5759434"
"NumSeats": 6,
}
```

From operation 213, the method proceeds to operation 214. Once the top-down meta-data is generated, the template image(s) and respective top-down meta-data is then stored (of course the template image may have been stored earlier). It can be stored anywhere, on a local server, remote server, cloud storage, etc. Typically, the template images and the top-down meta-data are stored on a server operated by the administrator and accessible by remotely (e.g., the "cloud") so that each casino utilizing the system can retrieve the template images and their respective top-down meta-data, but the template image(s) and top-down meta-data can be stored on any server/device described herein. See FIG. 8 as one example of an interface allowing the uploading of template images and respective meta-data to the "cloud" (a cloud-server or remote server), this is done by a technician working for the administrator.

FIG. 3 is drawing illustrating a layout of a table felt, according to an embodiment.

The layout is a clear top-down picture of a table felt. This can be taken by any party and uploaded (or emailed, etc.) so that it is transmitted to the administrator. This layout is started with in operation 100. The image illustrated in FIG. 3 is an image file (e.g., JPG, etc.)

FIG. 4 is a drawing illustrating a template generated from the layout from FIG. 3, according to an embodiment.

The template is generated from the layout to meet particular standards (so all templates meet the same standards) and can also be cropped as illustrated in FIG. 4. The template images should all be the same resolution, etc. This can be done in operations 201 and 202/203. The image illustrated in FIG. 4 is an image file (e.g., JPG, etc.) Note that all template images from different layouts should be standardized, so they all can be processed in the same way. For example, the template images can be cropped in the same manner so different points on different template images would correspond to the same point on the table.

FIG. 5 is a drawing illustrating the template illustrated in FIG. 4 with regions of interest filled in, according to an embodiment.

FIG. 5 can either be considered a merged image (with the template merged with the overlay) or the template with the overlay painted over it using a separate layer. Note that the different region types (card area region of interest (for the dealer) 501, player betting circles 502 which are betting area regions of interest) are painted with different colors to designate the different types of betting areas. Note that in FIGS. 5-6, the horizontally shaded areas represent one color and the vertically shaded areas represent a different color. The horizontally shaded regions are betting areas (betting area regions of interest) where the players place their bets (using chips) and the vertically shaded region is a card area region of interest (for the dealer's cards). The regions of interest can be filled in automatically (using optical recognition) or manually (by a technician working for the administrator). The image illustrated in FIG. 5 is an image file (e.g., JPG, etc.)

FIG. 6 is a drawing illustrating an overlay (which can be considered a "layer") with regions of interest used for the template illustrated in FIG. 4, according to an embodiment.

FIG. 6 can be considered an overlay, it designates the regions of interest (with different colors being used for different types of regions of interest) without associated template. Combining the overlay of FIG. 6 with the template of FIG. 4 results in the merged image of FIG. 5 (or combined image of FIG. 5 using the overlay as a separate layer). The overlay illustrated in FIG. 6 is an image file (e.g., JPG, etc.)

Figures 7, 8:
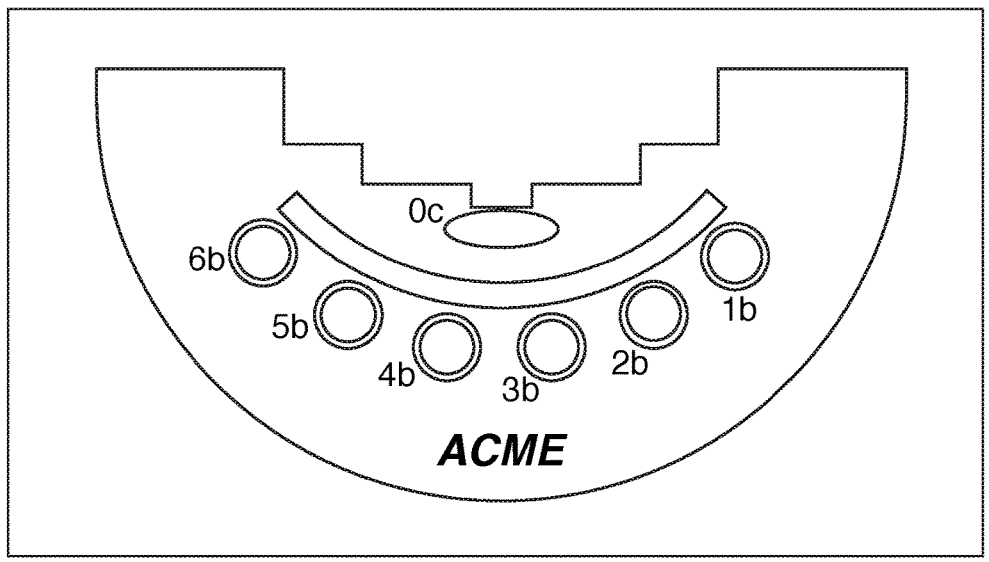
FIG. 7 is a drawing illustrating an identification/labeling of the regions of interest of the template illustrated in FIG. 4, according to an embodiment.
FIG. 8 is a drawing illustrating an interface enabling templates and top-down metadata to be uploaded to another server (such as the cloud), according to an embodiment.

FIG. 7 is a drawing illustrating an identification/labeling of the regions of interest of the template illustrated in FIG. 4, according to an embodiment.

The regions of interest are automatically (or manually) numbered in operation 210, the numbers for the regions of interest (e.g., '1b', '2b', etc.) are also referred to as the name of the region of interest (the names/numbers are reflected in the top-down meta-data). These names are matched with the numbering/names generated in 1005/1006 so that the positions identified in operations 1005/1006 can be match to the corresponding positions in the top-down meta-data. FIG. 7 is outputted on a computer screen to a technician.

FIG. 8 is a drawing illustrating an interface enabling templates and top-down metadata to be uploaded to another server (such as the cloud), according to an embodiment.

The administrator can initiate an upload of the templates and respective top-down meta-data to the cloud (e.g., a server accessible remotely) so that casinos can retrieve the templates and their respective top-down meta-data. Alternative, the templates and respective meta-data would not get uploaded to the cloud until after they are validated and then can be automatically uploaded (for example in operation 214). FIG. 8 illustrates such an interface enabling such uploads. The interface also enables administrators to update templates and their respective top-down meta-data at such times as the files are updated so that the updated files are distributed to the casinos (and the casino tables that need them).

Templates are distributed electronically to the casinos and the casino tables at those casinos so each table has the proper template and top-down meta-data that it needs. In an embodiment, every device at each table would get all the templates for that casino (where the table is located) so that if the casino decides to put another game on that particular table the electronics at the table would already have the respective template(s) ready.

Figure 9:
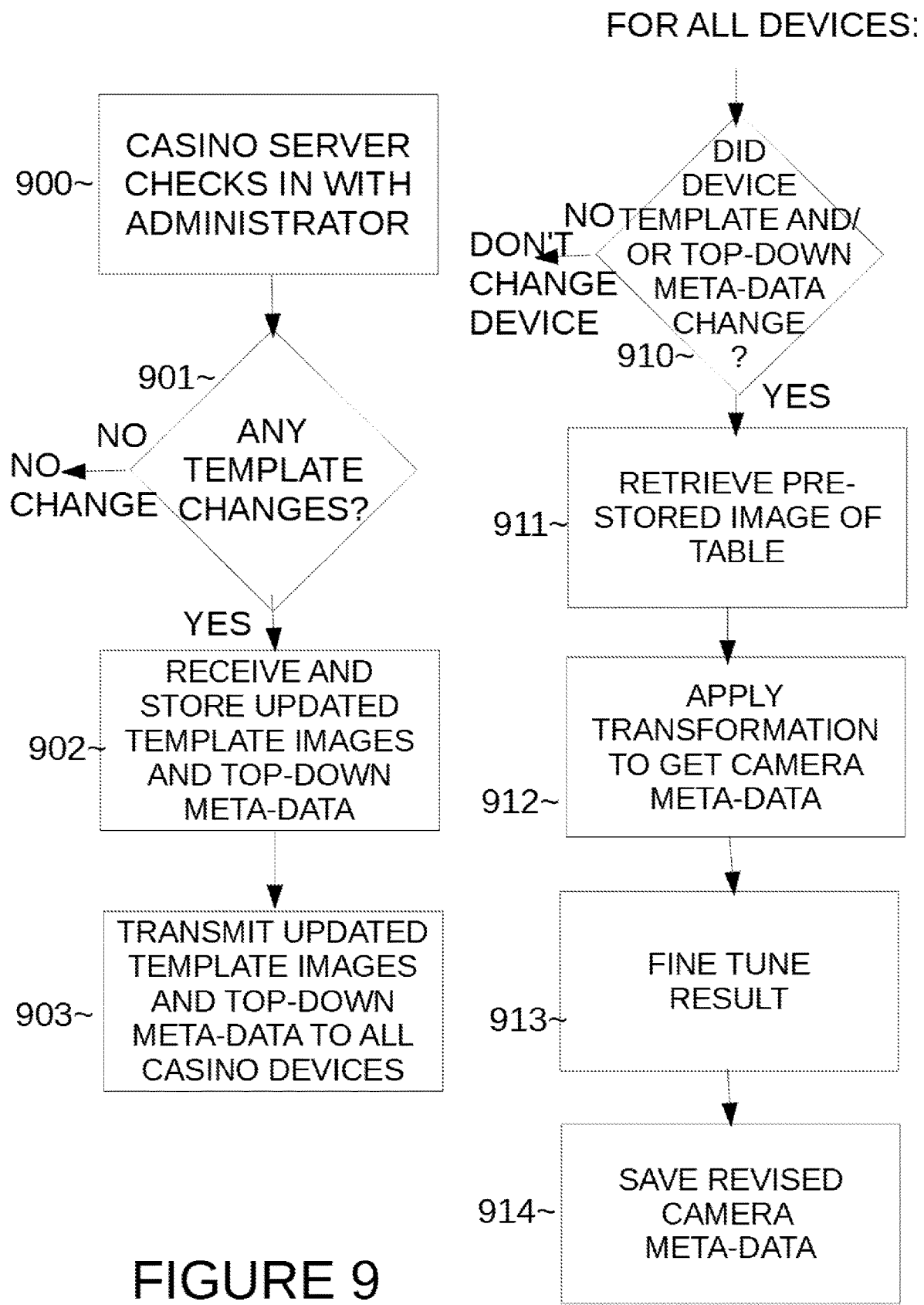
FIG. 9 is a flowchart illustrating an exemplary method of distributing templates and top-down meta-data to different casinos and tables, according to an embodiment.

FIG. 9 is a flowchart illustrating an exemplary method of distributing templates and top-down meta-data to different casinos and tables, according to an embodiment.

In operation 900, the casino server (also known as a "premise server") checks in with an administrator server (e.g., database) (could also be considered a "cloud server") operated by the administrator (e.g., a cloud server). This is the same server where template images and top-down meta-data are stored to in operation 214. These files are made accessible to all casinos which are part of the system. The casino server can continuously (and automatically) check in the administrator server (e.g., cloud server) to see if there are any updated templates on the system (for the particular casino served by this casino server). This can be done, for example, by the administrator server using a checksum computed for all of the templates (needed by that casino) and the casino server can poll the administrator server to see if the checksum has changed periodically (if the checksum has changed then there are new templates on the administrator server). Alternatively, as new templates (template images) and their respective top-down meta-data are made available, then a notification can be sent to the casino severs that new templates/top-down meta-data are available.

From operation 900, the method proceeds to operation 901, which determines if there are any changes (updates) to the current set of templates (and top-down meta-data) on the administrator server. If not, then there is no need to update the templates/top-down meta-data on the casino server and this method does not continue.

If in operation 901, there are any template/top-down meta-data changes (or new templates/top-down meta-data) then the method would proceed to operation 902, which would receive (from the administrator server) and store the updated (or new) template images and/or respective top-down meta-data on the casino server (or associated storage devices).

From operation 902, the method proceeds to operation 903, wherein the casino server then transmits the updated template images and/or updated top-down meta-data to all of the casino devices in the casino that are utilizing this technology (in other words the devices at the casino tables which are implementing the system described herein). This is so all of the casino devices at the tables have the latest versions of the templates and their respective top-down meta-data. Transmissions can be made using any kind of computer communications network (e.g., wired, wireless, etc.)

In operation 903, all of the updated templates and/or respective top-down meta-data are transmitted to all of the devices on the system so those devices can store local copies of the templates and top-down meta-data. In addition to storing the latest versions of the files, these devices may need to update their camera meta-data if the template/top-down meta-data that was updated applies to the same game and template image/layout (as some games may have multiple templates/layouts) that is currently set up to be played on the table that the particular device is located. For example, if a particular table is currently playing "ACME Blackjack" (which has the ACME Blackjack table layout on the table of which the ACME Blackjack template image and top-down meta-data is based upon), the device would then re-adjust itself in order to utilize the updated ACME Blackjack template image(s) and top-down meta-data.

Operation 910 determines whether a received updated template image(s) and top-down meta-data applies to the current game set up for play on the table (e.g., the layout on the table corresponds to any of the updated template image(s) and hence respective top-down meta-data). If updated template image(s) or respective top-down meta-data do not apply (correspond) to the current game set up for play on the table, then no further change is needed to be made by the device and the method can stop. A layout would correspond to a template image if the template image was generated from an image of that layout (subject to changes in the template image such as changes to resolution, cropping, etc., so that they are both really illustrating the same game.) If in operation 910, the current game set up for play on a particular table (e.g., that table layout is currently present on the table) corresponds to the updated template image/top-down meta-data then the device at that table should be updated and so the method would proceed to operation 911. In other words, if the template image and/or the top-down meta-data for the current game set up for play on this table has been updated, then the method would proceed to operation 911 as the table computer at the table needs to train for the updated template and/or top-down meta data (by adjusting the homography, etc.) It is possible that both the top-down meta-data file and its corresponding template image would be updated, or that only the template image but not the corresponding top-down meta-data file would be updated. However, it is more likely that the top-down meta-data would be updated but not the corresponding template image. This is because, after a period of time, the administrator may determine that the top-down meta-data needs to be adjusted to better define where the regions of interest actually are (for example, it might turn out that dealers don't generally deal to where the administrator initially anticipated requiring an adjustment of the regions of interest (and hence the top-down meta-data). If both the template image and the top-down meta-data for the current game set up for play on this table have not been updated, then the method would not proceed to operation 911 as no change to this table would be necessary.

In operation 911, the updated top-down meta-data is applied to the homography to determine revised camera meta-data. Camera meta-data is meta-data that identifies where the regions of interest are located on the views of (images captures by) the cameras trained (pointed) on the table (but these are typically not top-down cameras which would be directly above the table). Each table can have a number of cameras (e.g., 1 to 5 or more) placed at various places on the table pointed on the table to capture activity going on in the regions of interest on the table. The top-down meta-data identifies the regions of interest on the template (a top-down view) but with the cameras on the table the views are different and so the top-down meta-data needs to be adjusted in order to accommodate for the different view positions.

Homography is a mapping for points on the template images to the camera views and is generated in operation 1100. This mapping is used so regions of interest identified on the template image (the top-down view) can be transformed to identify where the regions of interest are located on the camera views on the table. The homography is based upon the positions and view directions of the cameras on the table. If the cameras change location or move the direction they are pointed in, then the homography would change. But if the cameras location and view direction remains the same, then the homography should typically stay the same even though the template image and/or top-down meta-data may have been updated.

So in operation 911, the previously generated homography (more on the homography is described herein) is applied to the updated top-down meta-data to determine the updated camera meta-data which identifies the regions of interest for each particular camera at the table. In this operation, if the top-down meta-data has not changed (i.e. only the template image has changed which is unlikely), then the camera meta-data would not change either.

In operation 911, a pre-stored image (e.g., a "training image") of an empty table (with no objects on it) from the particular is camera is retrieved (which can be stored during operation 1001) and used to pass to operation 912. Note however, that this operation (retrieving such an image) is typically only needed if in operation 912 the more complex embodiment is utilized.

From operation 911, the method proceeds to operation 912, which generates the camera meta-data. The transformation in operation 912 can be performed as described in operation 1102. This can be done using one of two methods. In a more simpler embodiment, the camera meta-data can be generated from the top-down meta-data using the known homography by applying a transformation (e.g., by using library functions in OPENCV) to the top-down meta-data to translate the regions of interest therein into camera meta-data which contain the regions of interest from the point of view of the table cameras (see operation 1102). Note that each camera would require its own transformation using the homography for that respective camera. Note that in OpenCV, the function Cvinvoke.PerspectiveTransform converts coordinates from one perspective to another based on homography. A related OpenCV function is CvInvoke.WarpPerspective, which converts an entire image from one perspective to another based on homography. Thus, as described herein, the ellipses defining the regions of interest from the top-down meta-data are transformed to the camera meta-data (defining the same regions of interest in the camera image)

Figure 20:
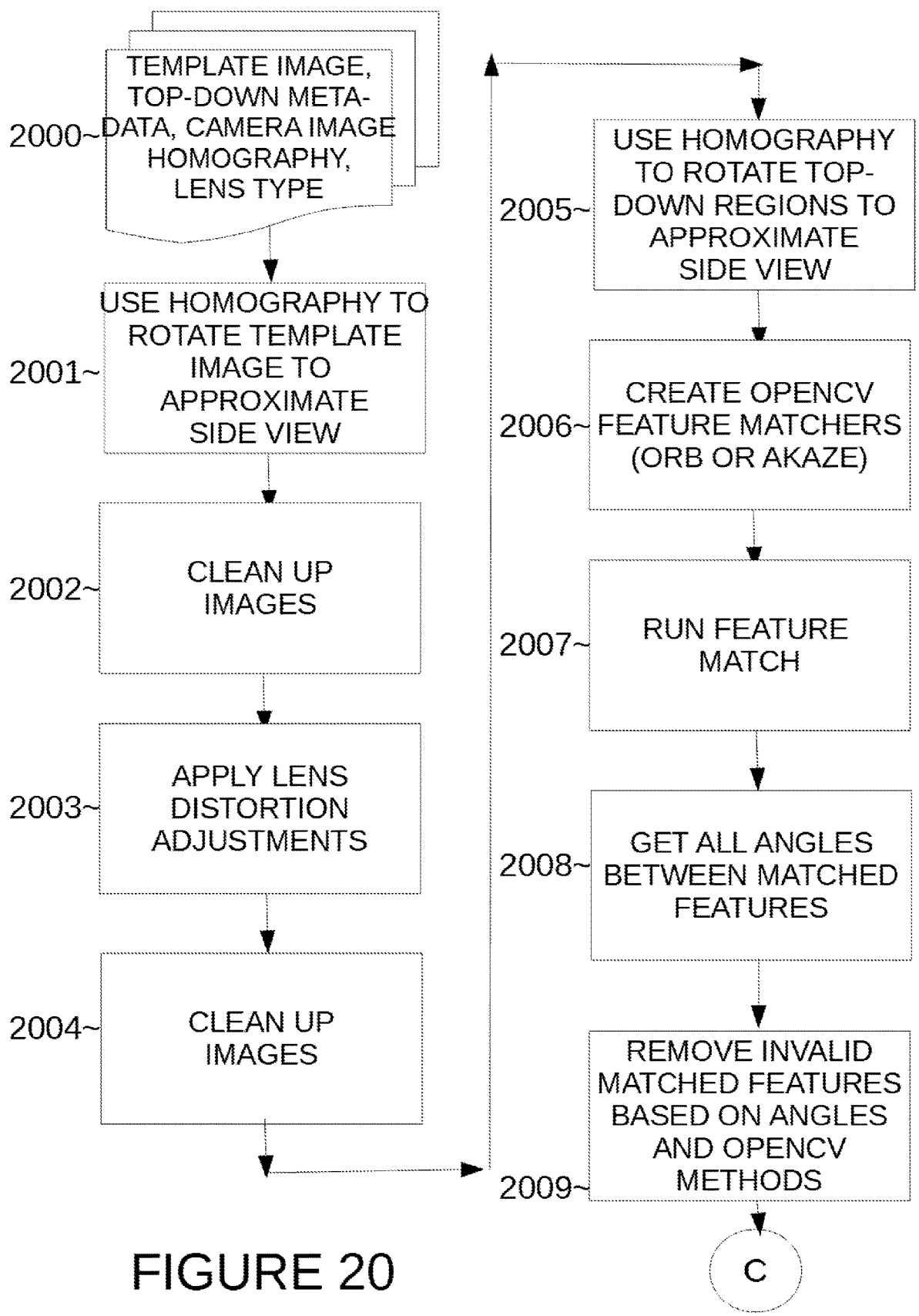
FIG. 20 is a flowchart illustrating an exemplary method of implementing a transformation to determine camera regions of interest, according to an embodiment.

In a more complex embodiment, in operation 912 camera meta-data can be generated by calling a more complex algorithm which is illustrated in FIG. 20. The updated template, updated top-down meta-data, updated camera meta-data (from operation 911), the homography, the pre-stored images retrieved in operation 911, and the lens type (e.g., the focal length such as 1.8 mm, etc.) of the respective camera, are all passed to the algorithm illustrated in FIGS. 20-22 (beginning at operation 2000) which will return camera meta-data of the regions of interest. Note that operation 2000 is called for each camera being used. This camera meta-data may be improved over the simpler method of determining the camera meta-data by simply transforming the top-down meta-data using the homography, the improvement being because of such things as lens distortion or a possible movement of the camera. This is also described in operation 1102

From operation 912, the method proceeds to operation 913 which fine tunes the result from the transformation. The updated camera meta-data is adjusted based on the actual locations of the bet positions that were determined when the technician was initially initializing the table (see operation 1100 which can store the bet positions of the betting circles at the table). For example, betting spot (also referred to as betting circle) 1b (the first bet) might return its center position to be at coordinates (50,500) but the previous run found the actual center of 1b to be (54,515). This would mean an adjustment of (4,15) pixels for all of the regions belonging to the first position (e.g., the first betting circle, the first card position, the first side betting circle, etc.). If the simple method (the simple transformation in operation 912 without calling operation 2000) is implemented, then the fine-tuning step can be skipped but a lens distortion correction (as known in the art) should be applied.

From operation 913, the method proceeds to operation 914, which saves the revised camera meta-data to the device. Each camera (e.g., left camera, right camera) at the table has its own camera meta-data which identifies where the regions of interest are located for the images taken by that camera.

Note that the method illustrated in FIG. 9 can be performed while the table is not being played on or while the table is in the middle of conducting a game. Note that as long as the cameras have not been moved too much (since the training/initiation for these cameras has been implemented) the homography for the cameras would remain the same. A small amount of shifting of the camera (e.g., not more than 20 pixels) could be permitted without requiring re-training.

When a new table is set up, homography needs to be generated. Homography is a set of points which map the points on the template image to points on the image taken by a particular camera at the table. In other words, Table II illustrates a sample homography. In Table II, (TX1, TY1) represents a first point on a template image, (TX2, TY2) represents a second point on the template image, (TX3, TY3) represents a third point on the template image, etc. (RX1, RY1) represents where the first point is found on an image taken by a right camera at a casino table, (RX2, RY2) represents where the second point is found on the image taken by the right camera at the casino table, and (RX3, RY3) represents where the third point is found on the image taken by the right camera at the casino table. (LX1, LY1) represents where the first point is found on an image taken by a left camera at a casino table, (LX2, LY2) represents where the second point is found on the image taken by the left camera at the casino table, and (LX3, LY3) represents where the third point is found on the image taken by the left camera at the casino table. All of these points are given in standard (x,y) coordinates. There is no limit to the number of pairs of points used in the homography (and the more points the more accurate the mapping, but there should be at least four pairs of points).

TABLE II

Template: {(TX1, TY1), (TX2, TY2), (TX3, TY3), . . .}
Right Camera: {(RX1, RY1), (RX2, RY2), (RX3, RY3), . . .}
Left Camera: {(LX1, LY1), (LX2, LY2), (LX3, LY3), . . .}

The initialize process would determine the homography for the table (which is dependent upon the position and angle of the cameras) so that the top-down meta-data can be transformed to identify the regions of interest on the side cameras (or any camera that is not at the top-down angle in which the template image was taken from which would capture a same image as the template image.

Given homography such as that in Table II (with at least four pairs of points), given a point on one image the corresponding point can be mapped on another image. This can be done as known in the art, for example there exists a function in OpenCV (Open Source Computer Vision) called invoked Perspective Transform which can accomplish this. Typically, at least four pairs of points would be needed to compute the perspective transform. Thus once given the homography, regions of interest (defined by points) on the template image(s) (e.g., the top-down meta-data) can be mapped to regions of interest as viewed by a camera using the OpenCV Perspective Transform function (or any other computer code which accomplishes this result). Typically (whenever in the current method/system the transformation is made), at least four point pairs (four points on the template image and their four corresponding points on the camera image) would be needed to make the transformation. The transformation can be made with any greater number (than four) amount of points (actually pairs of points, a point on the image taken by the camera and a corresponding point on the template), e.g., if there are seven detected betting regions (see operations 1003-1006) then all seven points (pairs) can be used. However, the transformation can also be done using four or more (but less than the number of known points), the points used can be chosen randomly or can be predetermined. This transformation can take place in operations 912 (in the "simple" embodiment where operation 2000 is not called), 1102 (in the "simple" embodiment where operation 2000 is not called), 2001 (in the more complex embodiment when operation 2000 is called by operations 912 92 1102). In this manner, video (or still) images from cameras can be analyzed and the regions of interest (from the top-down meta-data defined by the template image/overlay) as mapped to the viewpoint of the camera (e.g., the camera meta-data) are then analyzed for relevant activity (e.g., chips placed in betting regions, etc.)

Table III below represents one example of homography which can be used to map points from the top view (template) to points on the view from the right camera ("TABLER"). If there is another camera at the same table (e.g., a left camera), a different such file would exist for the homography for the left camera. The homography itself is two sets of points: a set of points on the template image which correspond (map to) a set of points on an image taken by a camera at the table (but not by a camera which has the same point of view as the point of view from which the template image would be taken which would be directly from the top-down). The homography data can also include other parameters, such as an identifier of the camera being mapped to (e.g., right camera, left camera, etc.) Thus, for example, point 727,172 on the top view (template image) corresponds to point 26,511 on the camera image, etc.

TABLE III

"_CamName": "TABLER",
"AutoDetectHomographyTopView":
"[727.0,172.0],[645.0,243.0],[548.0,287.0],[444.0,301.0],[340.0,284.0],[247.0,238.0],[171.0,166.0]",
"AutoDetectHomographySideView":
"[26.0,511.0],[227.0,498.0],[451.0,504.0],[688.0,535.0],[926.0,604.0],[1164.0,719.0],[1398.0,935.0]", In an embodiment, a casino may wish to change the game currently offered at a particular table. In order to effectuate this change using the system, a casino (or administrator) employee would go to the computer system at the table (e.g., which can be embedded inside a table sign or on a separate device) and indicate (by pressing buttons, etc.) that they want to change the game. Then, they can identify the new game (layout being used) at the table (e.g., see FIG. 12) and the respective pre-stored template image (assuming it is available) is retrieved. Then, the method can proceed to operation 912 in order to initialize this new (retrieved) template in the same manner as if a template was updated.

Figure 10:
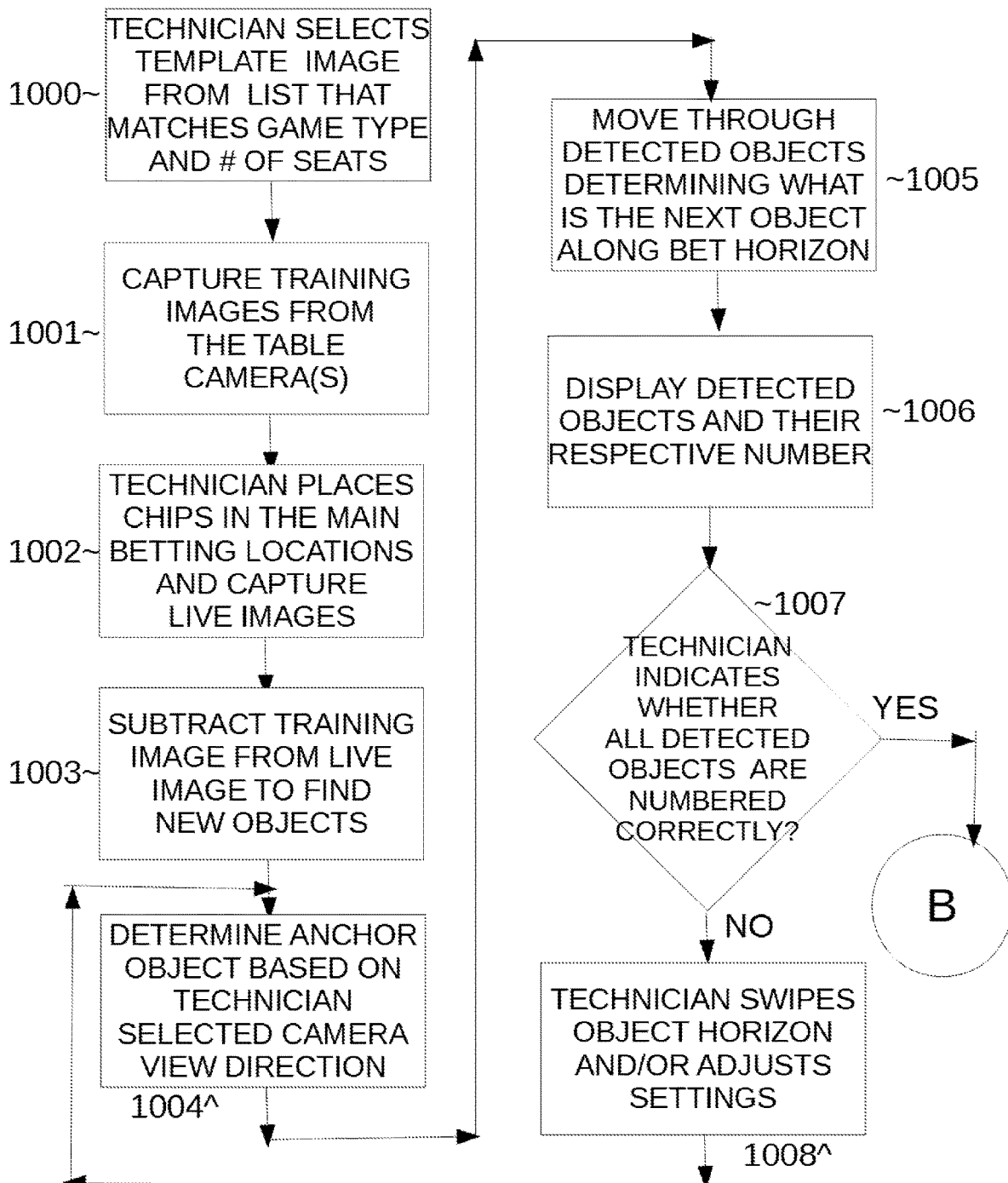
FIG. 10 is a flowchart illustrating an exemplary method of training cameras at the table in order to identify regions of interest, according to an embodiment.

FIG. 10 is a flowchart illustrating an exemplary method of training cameras at the table in order to identify regions of interest, according to an embodiment.

In operation 1000, a technician (working for the administrator or the casino) would be at an actual casino table in the casino. The location of the cameras and the direction they are pointed would be set by the technician and fixed so they would not move (or turn/change viewpoint). Change the location or direction the camera is pointed would change the homography (when the table is in play the camera(s) should be mounted to remain fixed in their location and orientation). The technician would select the proper template image from among the library of templates on the casino server which matches the game (layout) on the current table. Different templates may exist for the same game depending on the number of seats, so the appropriate template should be selected based on the number of seats at the table. This can be done using a computer (or table sign serving as a computer) at the table itself, which has in output device and an input device (e.g., touch-screen).

From operation 1000, the method proceeds to operation 1001, in which the cameras at the table capture training images of an empty table (no objects placed on the table). Table cameras can also refer to "side view cameras" since cameras at the table would typically take side views but would not be able to take top-down views because that would require a camera on the ceiling. In an embodiment, cameras mounted on the ceiling can be used in the same manner as side cameras as described herein.

From operation 1001, the method proceeds to operation 1002, wherein the technician places chips in the main betting locations and live images are captured on the table cameras. Note that each camera at the table would be "trained" individually (operations 1001 to 1008 would be performed for each camera).

From operation 1002, the method proceeds to operation 1003 which subtracts the training image (taking from operation 1001) from the live image (taken in operation 1002) in order to find the objects (e.g., chips) placed in operation 1002. In other words after the subtraction, only the objects placed in operation 1003 are included in the image.

From operation 1003, the method proceeds to operation 1004, which determines an anchor object (in the subtracted image determined in operation 1003) based on the technician's selected camera view direction. In other words, the anchor object is typically the object closest to the camera. The anchor object can be manually selected by the technician or automatically identified by the system.

Figure 17:
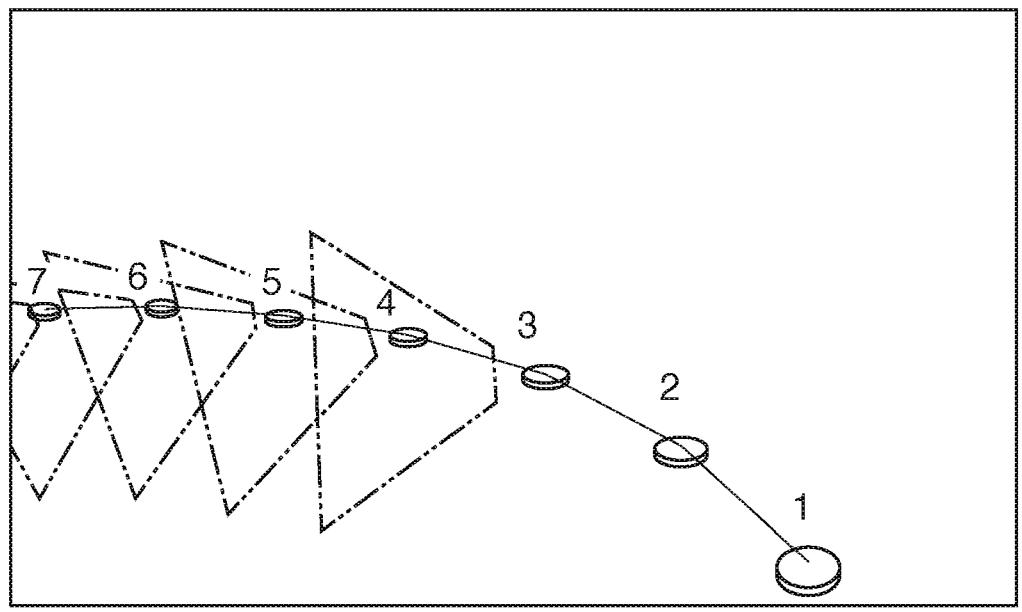
FIG. 17 is an example of identified objects and polygons used to predicts locations for the objects, according to an embodiment.

From operation 1004, the method proceeds to operation 1005, which automatically moves through all of the detected objects (using the subtracted image from operation 1003) and numbers (names) the objects in order of their distance along the "bet horizon." The numbers/names would be used to match these identified positions to their corresponding positions in the top-down meta-data. Note that typically the automatic number is done so that number 1 is the betting circle (chip) closest to the camera, and then 2 is the next betting circle (chip) and so on (in another embodiment, the automatic numbering can number the betting circles (FIG. 17) so each betting circle's number/name matches its corresponding betting circle/betting region of interest from the template (FIG. 7), in this embodiment number 1 in the camera image would instead say '7b', number 2 in the camera image would instead be '6b', etc.) The technician using the system can indicate to the system where the camera is located (e.g., left camera (pointed right) or right camera (pointed left)). In this way, the system would know which of the identified positions matches the respective betting region of interest in the top-down meta-data so the camera meta-data would use the same name/identifier for that betting region of interest. For example, betting circle number 1 in FIG. 17 would correspond to what would be betting circle 7b in FIG. 7 (the layout/template in FIG. 7 is not the same as the one used in FIG. 17 but nevertheless for illustrative purposes assume FIG. 7 had a betting circle 7b numbered in the manner), and betting circle number 7 in FIG. 17 would correspond to betting circle 1b in FIG. 7 (again, these are not the same layouts but this is mentioned for exemplary purposes). Each region of interest can have a unique name/identifier which would be used to map a region of interest in the top-down meta-data to the same region of interest in the camera meta-data. The bet horizon is the path from the anchor object to the farthest object on the table. Each successive object is detected by using the previous angle and distance as hints to predict where the next object (chip) might be. The polygons illustrated in FIG. 17 represent the predicted locations for the objects.

From operation 1005, the method proceeds to operation 1006, which displays all of the detected objects and their respective number (e.g., the detected objects should all be numbered in order based on their position on the table).

From operation 1006, the method proceeds to operation 1007, which prompts the technician to confirm whether the all of the objects are detected and are numbered correctly. The numbering of objects can be automatically displayed (e.g., see FIG. 17) and the numbering/naming used for each region of interest in the camera meta-data should match the corresponding region of interest (e.g., betting circles) used on the top-down meta-data for the template image (e.g., see FIG. 7 although the template in FIG. 7 does not correspond to the layout used in FIG. 17 but nevertheless illustrates a numbering of regions of interest). The numbering/naming of betting regions of interest should match so that the detected chips (by the camera) can be mapped to their corresponding betting region of interest on the template image (for example see FIG. 7). If the technician responds with yes (that all of the objects are detected and numbered correctly), then the method proceeds to connector B which continues onto FIG. 11.

If in operation 1007, the technician responds to the system that the objects are not all numbered correctly (or all of the objects are not detected), then the method proceeds to operation 1008. In operation 1008 (see FIG. 19), the technician can swipe (trace out) on the touch-screen the bet (object) horizon (the arc of the object locations on the table) so that the system can use this information (as a "hint") to look for the objects and order them in the proper order. The technician can also adjust some of the settings (e.g., white balance, etc.) in order to get a better image of the table. The method then returns to operation 1004, where another attempt is made to identify all of the objects in the proper order.

Note that the method illustrated in FIGS. 10 (and 11) are performed for each camera at the table. After training one camera at the table (e.g., the left camera) next another camera at the same table (e.g., the right camera) needs to be trained in the same manner.

Figure 11:
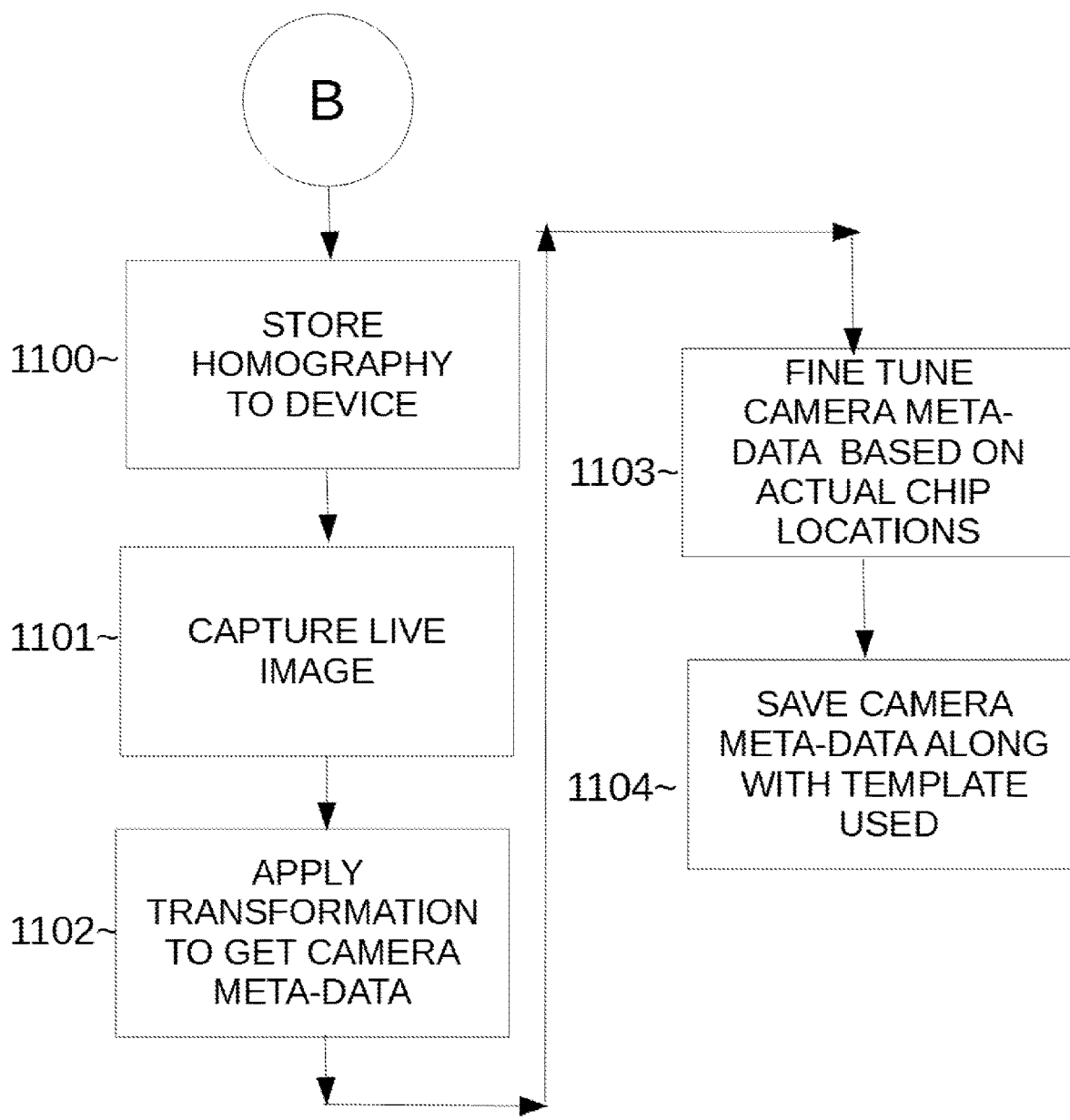
FIG. 11 is a flowchart illustrating an exemplary method of generating the camera meta-data, according to an embodiment.

FIG. 11 is a flowchart illustrating an exemplary method of generating the camera meta-data, according to an embodiment. From connector B, the system now knows where all of the objects are (e.g., their coordinates) for the respective camera.

In operation 1100, the homography is stored to the device (e.g., the camera or device/computer at the table driving the camera). The point used (coordinate) is typically the point at the center of the object (e.g., the center of the chips detected). The homography can be stored for example in a format such as that illustrating in Table III. Thus, the points detected in FIG. 10 are now all stored in a homography file along with corresponding top-down meta-data points.

From operation 1100, the method proceeds to operation 1101 which captures the live image at the table using the respective camera. This operation can be optional, as a previously captured live image can be used, or if the simple method is applied in operation 1102 then another image is not needed to apply the transformation.

From operation 1101, the method proceeds to operation 1102. In one embodiment, operation 1102 can generate the camera meta-data by using the homography and the top-down meta-data as described herein (by converting the regions of interest in the top-down meta-data to camera regions of interest in the camera using the homography by using known math and/or open source functions such as PerspectiveTransform in OpenCV (or others)). This simply transforms the regions of interest described in the top-down meta-data using the homography to obtain their locations in the camera's image. Note that each camera would require its own transformation using the homography for that respective camera. All regions of interest (including the betting regions of interest where the chips were detected) present in the top-down meta-data should be converted (transformed) into camera meta-data (so the regions of interest in the images taken by the camera(s) can be analyzed).

Note that (in an embodiment) when points are transformed from the top-down meta-data to the camera meta-data (using the homography), an ellipse (defining the region of interest) is also transformed from the template image to the camera image. For example, in FIG. 7, betting region of interest 1b (and all betting regions of interest) are circles (a circle is an ellipse where the width equals the height). Note however, that when this circle is transformed into the image taken by the camera, the circle then becomes an ellipse (where the width does not equal the height). This elliptical region defines the betting region of interest on the image taken by the camera and is what should be analyzed by any software analyzing the regions of interest for activity. Thus, while points on the template image are transformed to the image (view) taken by the camera, there is also another similar transformation taking place regarding the boundaries of the betting region. This can be accomplished by computing points on the ellipse perimeter defining the region of interest on the template image (points on the ellipse can easily be computed using trigonometry). Parameters of the ellipse for each region of interest on the template image as defined in the top-down meta-data (e.g., center x, center y, angle, width, height). For a circle, the width=height and the angle (rotation) shouldn't matter. Any number of such points can be computed on the ellipse defining a region of interest on the template (top-down meta-data) used, e.g., 5 to 10 or more as the more points the more accurate it will be. These elliptical points on the template image are then also transformed to the camera view (in the same manner as transforming points herein described herein using the homography) to elliptical points on the camera image. Then, an ellipse is determined that is defined by the elliptical points on the camera image, using an OpenCV library function such as fitEllipse which returns the parameters defining an ellipse such as the center x (x coordinate of its center), center y (y coordinate of its center), width, height, angle (rotation in degrees) from the points on the perimeter of the ellipse. These parameters are then used to define the ellipse in the camera meta-data. In this way, all of the ellipses defining all of the regions of interest in the top-down meta-data (from the template image) are transformed into corresponding ellipses defining the same regions of interest but in the camera image (stored as camera meta-data). In this way, all regions of interest on the template image are transformed to their corresponding (respective) regions of interest in the respective camera view (these transformations are done for each camera).

In another embodiment, instead of simply generating the camera meta-data using a simple transformation using the homography as described above, in operation 1102 a more complex method can be used to determine the camera meta-data. In this more complex embodiment, operation 1102 would apply (e.g., by calling it as a subroutine) the transformation illustrated in FIG. 20 starting with operation 2000 (and continues to FIGS. 21-22). Note that operation 2000 is called for each camera being used. The end result is the camera meta-data may be improved over the camera meta-data which can be determined in operation 1101 without the transformation illustrated in FIG. 20. One reason the more complex method may return better results is due to camera lens distortion or a possible movement of the camera or a device in which the camera is contained.

From operation 1102, the method proceeds to (optional) operation 1103, which fine tunes the camera meta-data based on actual chip locations. This can be done as described with regard to operation 913. For example (and this applies to the fine tuning in operation 913 as well), the system now knows the centers of the regions shown when determining the homographies (which are the centers of the bet circles). The system also knows the centers of the betting circles as calculated by the method illustrated in FIGS. 20-22). The different (but corresponding) regions are compared and the regions of interest would be shifted based on the deltas (change between the two regions). If the simple method (the simple transformation in operation 1102 without calling operation 2000) is implemented, then the fine-tuning step can be skipped but a lens distortion correction (as known in the art) should be applied.

From operation 1103, the method proceeds to operation 1104, which stores the camera meta-data along with the template used and any other relevant data. Table IV below illustrates one example (of a small portion for illustrative purposes but an entire set of camera meta-data would be much longer) of how the camera meta-data can be stored. The camera meta-data stores all of the regions of interest and where they are located for each camera (i.e., on each image taken by that camera). So when an image is taken by that camera, the camera meta-data identifies the location (which can be identified by coordinates, etc.) on that image where regions of interest are located so they can be further analyzed by the system (or another system). "TABLER" is the right camera on a table, while "TABLEL" is the left camera on the table. If there is one camera being used, it should be able to see all of the regions of interest on the table. If there are two cameras being used, between both cameras they should be able to see all of the regions of interest on the table. This is true for as many cameras as are used on the table. The data illustrated in Table IV is the camera meta-data can be considered the "final product" of the system described herein (before operation 104 is performed which actually uses this data to analyze activity on the table). Note that this data can be stored in numerous ways and this is only one example.

TABLE IV

```
{
    "_CamConfigs": {
        "TABLER": {
            "_ROIBets": {
                "_Id": "c649873e-ba21-419d-9d09-7f9b59f8a10e",
                "_Num": 3,
                "_Name": "3b",
                "_CamName": "TABLER",
                "_Ellipse": {
                    "_CenterX": 451.0,
                    "_CenterY": 504.0,
                    "_Angle": 265.117,
                    "_Width": 155.475891,
                    "_Height": 40.06923,
                    "_BoundingRect": "424, 425, 54, 158"
                },
                "_Type": 2
            },
            "_ROISideBets": {
                "_Id": "4a00eaa5-a1da-4f98-857a-98d5ed018f20",
                "_Num": 3,
                "_Name": "3s",
                "_CamName": "TABLER",
                "_Ellipse": {
                    "_CenterX": 334.45166,
                    "_CenterY": 520.465149,
                    "_Angle": 262.702881,
                    "_Width": 73.53546,
                    "_Height": 20.4066086,
                    "_BoundingRect": "320, 483, 29, 75"
                },
                "_Type": 3
            },
            "_CamName": "TABLER",
            "_AutoDetectHomographyTopView":
"[727.0,172.0],[645.0,243.0],[548.0,287.0],[444.0,301.0],[340.0,284.0],[247.0,238.0],[171.0,166.0]",
            "_AutoDetectHomographySideView":
"[26.0,511.0],[227.0,498.0],[451.0,504.0],[688.0,535.0],[926.0,604.0],[1164.0,719.0],[1398.0,935.0]",
        },
        "TABLEL": {
            "_ROIBets": {
                "_Id": "aaaa8491-4f04-40c3-9784-50b1310b6b77",
                "_Num": 4,
                "_Name": "4b",
                "_CamName": "TABLEL",
                "_Ellipse": {
                    "_CenterX": 687.0,
                    "_CenterY": 535.0,
                    "_Angle": 268.084351,
                    "_Width": 178.361664,
                    "_Height": 51.9952927,
                    "_BoundingRect": "658, 445, 58, 180"
                },
                "_Type": 2
            },
            "_CamName": "TABLEL",
            "_AutoDetectHomographyTopView":
"[727.0,172.0],[645.0,243.0],[548.0,287.0],[444.0,301.0],[340.0,284.0],[247.0,238.0],[17
```

TABLE IV-continued

```
1.0,166.0]",
      "_AutoDetectHomographySideView":
"[26.0,512.0],[227.0,498.0],[451.0,504.0],[687.0,535.0],[926.0,604.0],[1164.0,719.0],[14
01.0,936.0]",
    }
  },
}
```

Note that regions of interest are defined for each of two cameras (although there can be any other number of cameras as well such as 1 to 10 or more). The "name" tag in Table IV is a unique identifier for the particular region of interest being defined (see FIG. 7) where regions of interest are given unique names (e.g., "3b"). The "Type" tag identifies what type of region of interest is defined (e.g., 2 for a betting region, 3 for a side bet, etc.) The field descriptions used in Table IV for the camera meta-data can be the same as used in Table I for the top-down meta-data. Note that a field CamName indicated which camera captures the ROI.

Note the correlation between the camera meta-data in Table IV and the top-down meta-data in Table I (if portions of Table IV were to represent a transformation of ROI defined in Table I). For example, in the top-down meta-data, betting region "3b" is located at an ellipse with X=507.2059, Y=304.739624, angle=174.947662, width=75.48305, height=76.14297. Note that X and Y are the (x,y) coordinates in the width and height are the height of the ellipse (if the width=height it would be a circle), and angle can be the rotation of the ellipse. In the camera meta-data, this same betting region "3b" is found on the image taken on the right camera ("TABLER") as an ellipse with X=451.0, Y=504.0, angle=265,117, width=155.475891, height=40.06923. Thus, this same region maps to a different area on the image because of course the images from the table cameras are taken at a different angle than top-down (the template is a top-down image) as well as a different resolution. So given the homography, all of template regions of interest (defined in the top-down meta-data) can be translated to camera meta-data (where the same regions of interest can be found on images taken by the respective camera) using the homography. Note that the "Boundingrect" tag defines a rectangle which can bound the defined ellipse. Each region of interest in the top-down meta-data would map to a left, right (or both) camera image in the camera meta-data. Different homography would exist for each camera (since each camera has a different view).

Note the homography is also present in the camera meta-data in Table IV for both the right camera ("TABLER") and the left camera ("TABLEL"). The tag "CamName" designates the particular camera, the tag "AutoDetectHomographyTopView":"represents center of bet positions from top view for the template assigned to this table, and the tag "AutoDetectHomographySideView" represents center of the bet positions from a camera view (e.g., right camera, left camera, etc.) Note that the points in the AutoDetectHomographyTopView and AutoDetectHomographySideView represent the same locations but for the different frames of reference (e.g., template image for the AutoDetectHomographyTopView and camera image for the AutoDetectHomographysideView). Mathematically each set of points defines a plane and once both planes are defined it is a known mathematical function (e.g., the OpenCV function PerspectiveTransform) to transform any point on one plane to the other (which is how regions of interest known on the template can be converted to a camera view).

Figure 21:
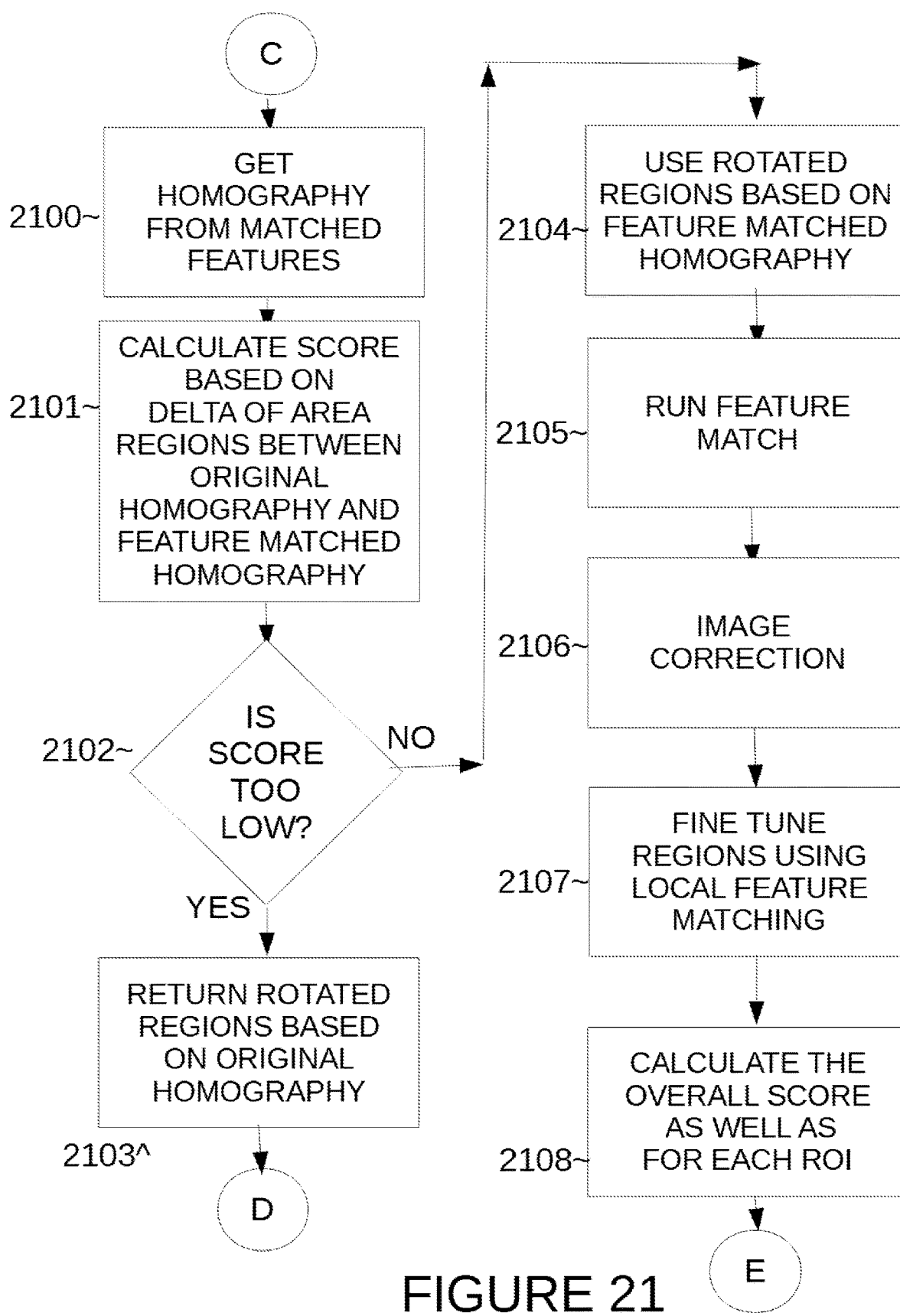
FIG. 21 is a flowchart continuing the exemplary method of implementing a transformation to determine camera regions of interest, according to an embodiment.
Figure 22:
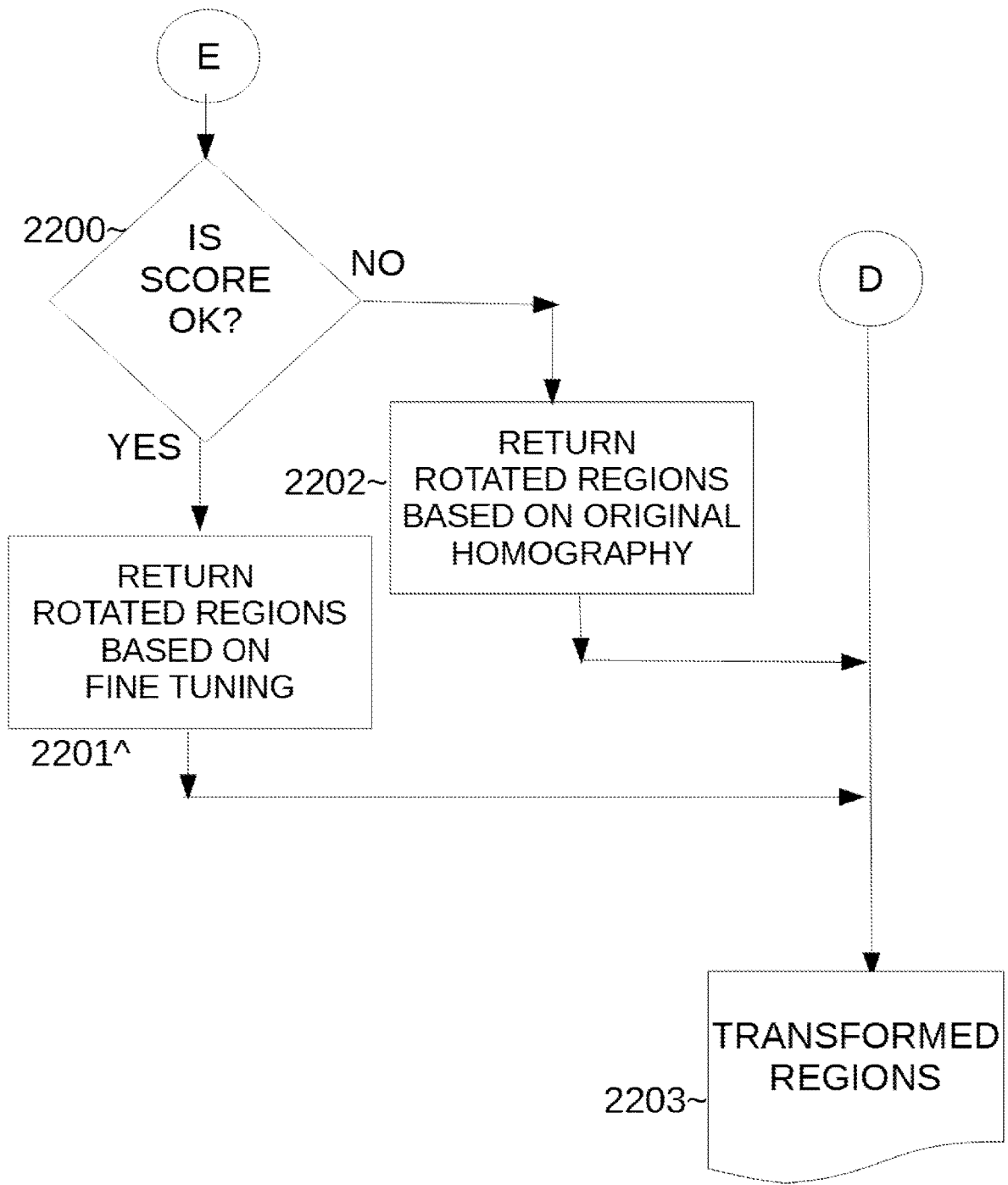
FIG. 22 is a flowchart completing the exemplary method of implementing a transformation to determine camera regions of interest, according to an embodiment.

The camera meta-data in general is generated by either 1a) a simple mathematical transformation from the top-down regions of interest to the camera regions of interest via the homography, or 1b) the more complex method illustrated in FIGS. 20-22 which in addition to the simple mathematical transformation from the top-down regions of interest to the camera regions of interest via the homography and then adjusting further by transforming the template image to match the camera image to improve accuracy of the regions of interest, and then (after either 1a or 1b) then 2) fine tuning (operation 913 or 1103) to slightly shift the regions of interest to match where the actual objects (e.g., chips) were placed on the layout and also applying a lens distortion correction.

Figure 12:
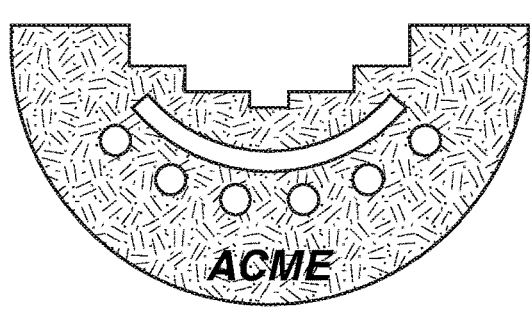
FIG. 12 is an example of an output of different templates that can be selected to match a particular game at a casino table, according to an embodiment.
Figure 12:
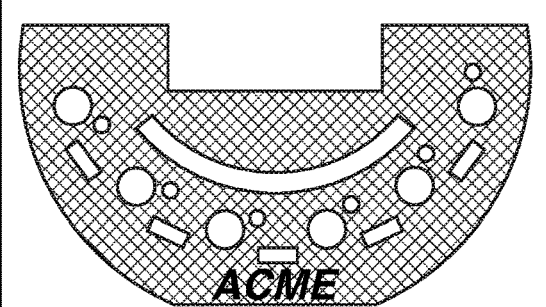
Figure 12:
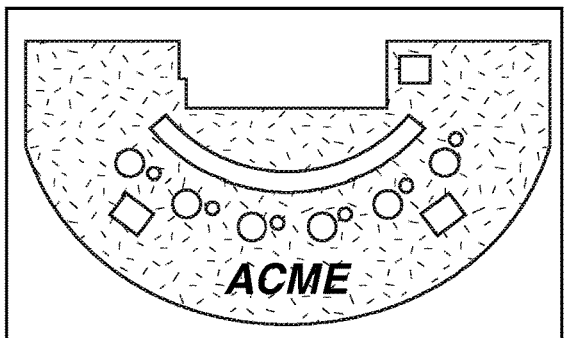
Figure 12:
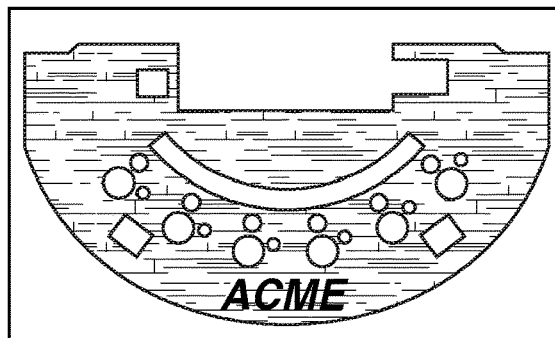

FIG. 12 is an example of an output of different templates that can be selected to match a particular game at a casino table, according to an embodiment.

In operation 1000, a technician can scroll through multiple template images on a computer at the casino table to pick out (e.g., by touching) the particular template that matches the felt installed at the particular casino table.

Figure 13:
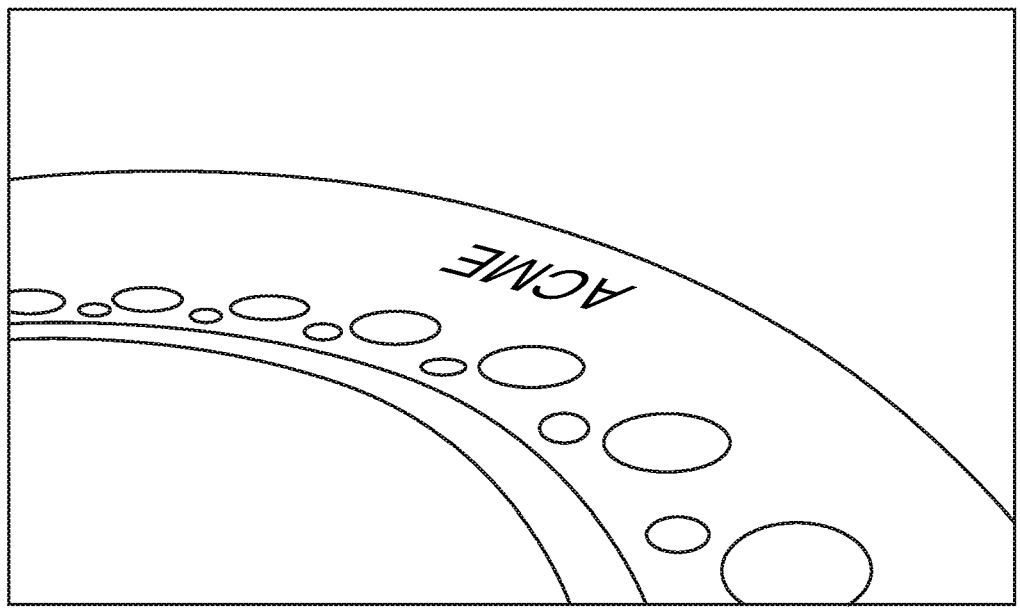
FIG. 13 is an example of a camera image of an empty table, according to an embodiment.

FIG. 13 is an example of a camera image of an empty table, according to an embodiment.

In operation 1001, the camera takes an image of an empty (clear) table with no objects on it. This is used later to identify objects placed on the table.

Figure 14:
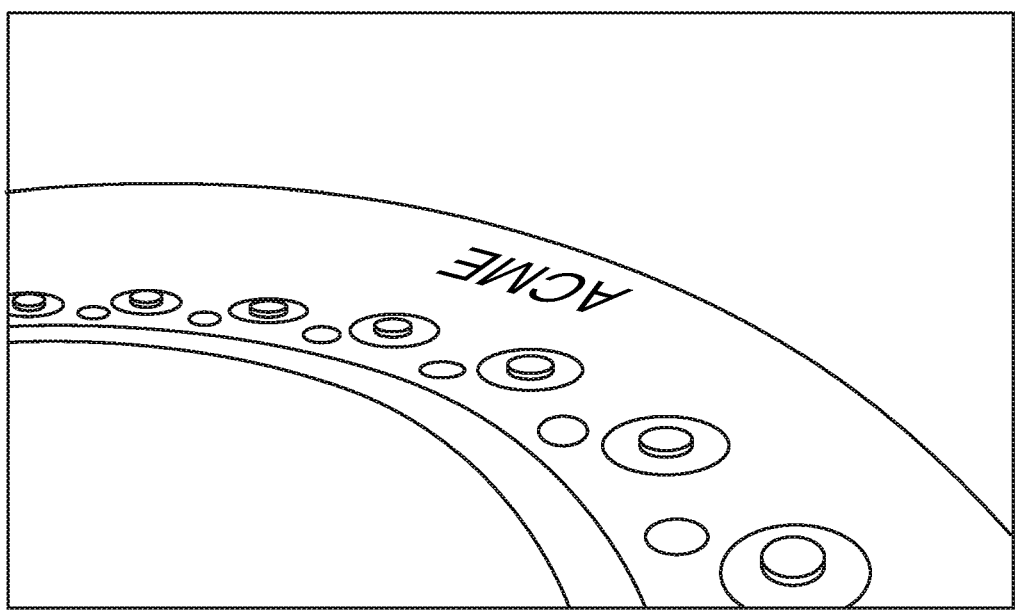
FIG. 14 is an example of a camera image of bets placed at the empty table, according to an embodiment.

FIG. 14 is an example of a camera image of bets placed at the empty table, according to an embodiment.

In operation 1002, the technician places objects on the table (e.g., a chip on all of the betting circles) so the locations of the betting circles can be identified. While the locations of the betting circles are known in the top-down meta-data, they are not yet known on the table cameras (e.g., right camera, left camera, and others) which are located and pointed at the table.

Figure 15:
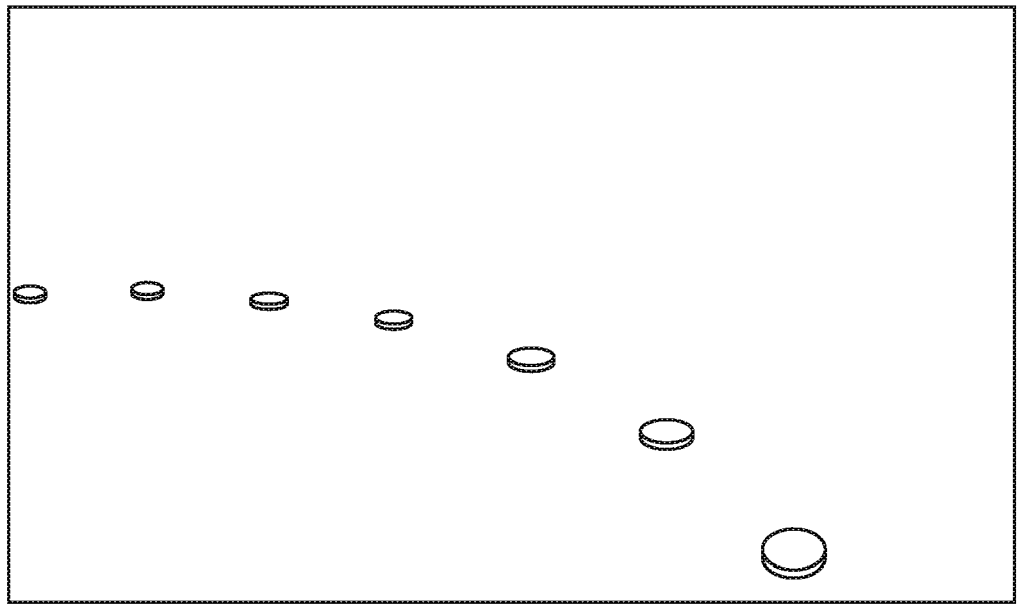
FIG. 15 is an example of the bets placed image subtracted from the empty table, according to an embodiment.

FIG. 15 is an example of the bets placed image subtracted from the empty table, according to an embodiment.

The empty table image (FIG. 13) is subtracted from the empty table with objects image (FIG. 14) to produce the image illustrated in FIG. 15 which shows just the new objects placed in operation 1002. This shows the betting circles for each of the players (betting circles are regions of interest). The subtraction can be done, for example, by using Open CV functions (e.g., absdiff). This is done in operation 1003.

Figure 16:
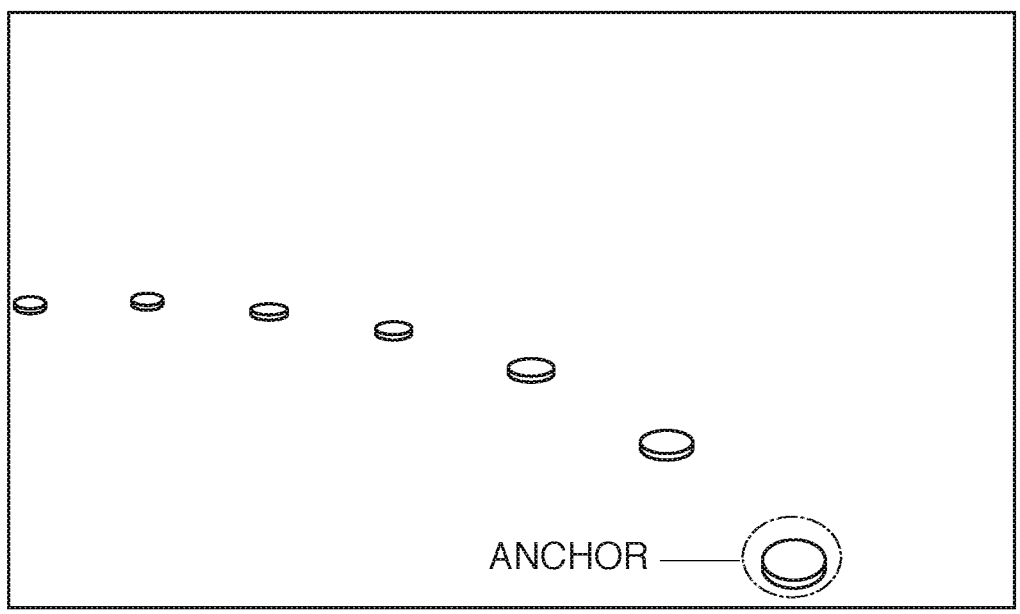
FIG. 16 is an example of an anchor object identified in the subtracted image, according to an embodiment.

FIG. 16 is an example of an anchor object identified in the subtracted image, according to an embodiment.

In operation 1004, an anchor object is identified out of all of the objects identified in operation 1003. Usually, for a camera located on the left side (left as seen by the players, right as seen from the dealer's side of the table) of the table, the anchor object will be in the lowermost right position out of all of the objects.

FIG. 17 is an example of identified objects and polygons used to predict locations for the objects, according to an embodiment.

In operation 1005, the system moves through all of the objects to number them consecutively. Typically, the next closest object after the anchor object will be considered the second object. Then after that, the previous angle and distance are used as hints to predict where the next object would be. Polygons can be used as illustrated in FIG. 17 in order to represent the predicted locations for the objects. Note that the numbering can also be in reverse order as well (e.g., '1' would be '7', '2' would be '6', '3' would be '5', '4' would be '4', '5' would be '3', '6' would be '2', '7' would be '1') to be consistent with the numbering direction illustrated in FIG. 7. These numbers can be used as names to identify each region of interest and each number can be appended with a letter (e.g., 'b' to indicate it is a betting region of interest). The numbering used on the regions of interest where the chips are placed should correspond to the numbering used on the top-down meta-data (of the template) so that the corresponding regions of interest on one (e.g., the top-down meta-data) can be mapped to the corresponding regions of interest on the other (e.g., the camera meta-data).

Figure 18:
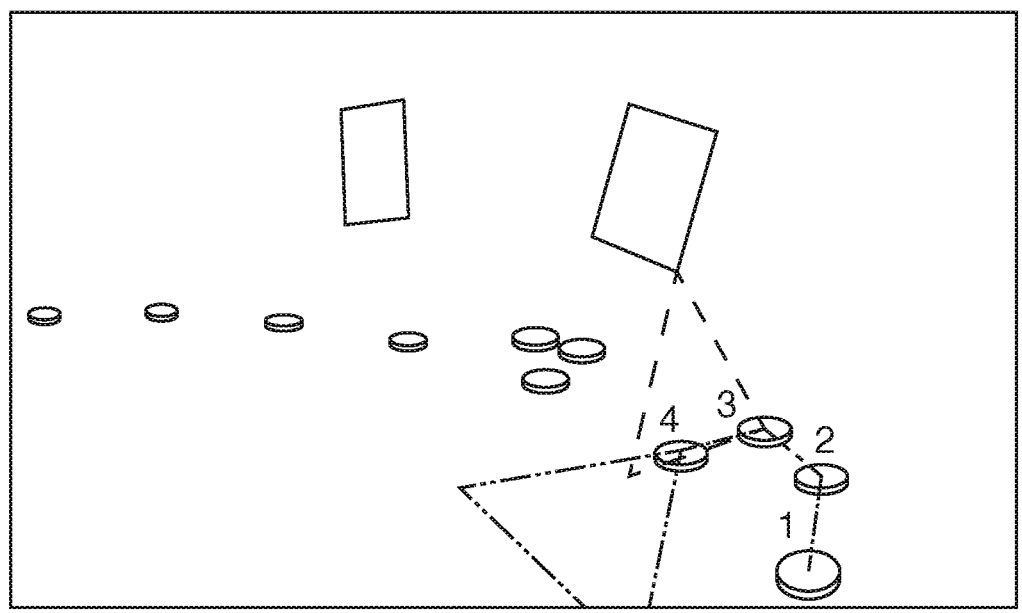
FIG. 18 is an example of the system incorrectly identifying all of the new objects, according to an embodiment.

FIG. 18 is an example of the system incorrectly identifying all of the new objects, according to an embodiment.

FIG. 18 illustrates a situation where the system incorrectly identified all of the new objects. This can be due to noise, background activity, extra objects on the table, or other imperfections in the system. In this situation, the technician would indicate to the system (in operation 1007) that the objects are not numbered correctly so that the method would proceed to operation 1008 so that the technician can try to give the system additional information to improve its identification and numbering of the objects.

Figure 19:
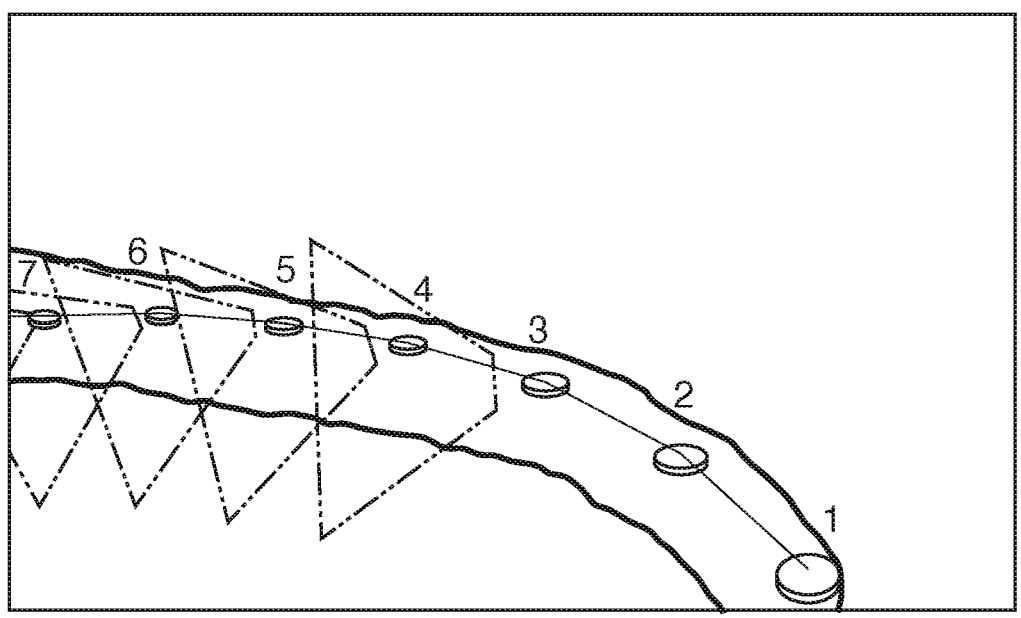
FIG. 19 is an example of a technician tracing out an arc of bet locations on the table, according to an embodiment.

FIG. 19 is an example of a technician tracing out an arc of bet locations on the table, according to an embodiment.

In operation 1008, the technician can trace out the object arc where the objects are located. For example, in FIG. 19 there are two arcs that are traced (using a touch-screen) by the technician, whereas the objects (chips/bets) are in between the two arcs. In another embodiment, the technician can trace one line which touches all of the objects (chips/bets). The numbering in FIG. 19 can correspond to the numbering used for top-down meta-data mapping, or if different names/numbers are used the system would know (e.g., by the direction the camera is pointed which can be inputted into the system) which numbered detected chip in a betting circle corresponds to which region of interest on the template (top-down meta-data) so the camera meta-data can be generated in which the regions of interest therein correspond to the counterpart regions of interest in the top-down meta-data.

While it has been described that once the top-down meta-data is known and the homography, then regions known on the template (i.e., the top-down meta-data) could be mathematically mapped to regions on the camera views (i.e., the camera meta-data). Instead of the simple mathematical transformation, an optional more complex algorithm (see FIGS. 20-22) can be used which takes into consideration the images on the table captured by the table cameras which can be correlated to template image. Using this additional information, corrections for things such as lens distortion by the camera lens as well as a slight change in position of the camera can be accounted and adjusted for.

For example, the graphics on the template image (e.g., the "ACME" in FIG. 4 or 5, the betting circles, etc.) can be transformed and correlated to the graphics on the camera image (e.g., the "ACME" in the camera image (for example see FIG. 14)) in order to more accurately correlate the camera image to the template image and make adjustments to the regions of interest determined initially by the homography to more accurate locate the regions of interest in the camera image (and then stored as the camera meta-data).

FIG. 20 is a flowchart illustrating an exemplary method of implementing a transformation to determine camera regions of interest, according to an embodiment.

In operation 2000, the method starts at least with the following inputs: the template image(s), top-down meta-data, which camera image, homography, and the camera lens type (e.g., the focal length, etc.)

From operation 2000, the method proceeds to operation 2001, which uses homography to rotate the template image to approximate the side view. Starting from a top-down view of a table the viewpoint is changed (using a so-called homography) to resemble what a camera on the side of the table would see. This can be done by using mathematical transformations known in the art (e.g., an Open CV function called WarpPerspective). The template image(s) should be warped (rotated/twisted etc. to the same plane as the table from the camera's point of view) so that pattern matching can be done. Because the camera can be in a slightly different location than originally 'guessed', the approximate side view and the view from the camera will be very similar but not identical (although in another embodiment, guesses are not used). The rest of the workflow tries to correct this difference.

From operation 2001, the method proceeds to operation 2002, which cleans up the images.

From a camera's side-view point of view the table with chips and cards is visible in the bottom of the camera image whereas the top part of the image (i.e., everything above the edge of the table) will contain people, chairs, and other information that is irrelevant to the ROI positioning. In the later step the approximate side-view gets aligned with the camera side view and to make this work as well as possible the area above the edge of the table gets erased before trying to align them (since otherwise irrelevant information can throw off the alignment). In order to do this the table edge in the top-down template is stored and also calculated when going from the top-down to the approximate side-view template. Everything above the table's edge is discarded in the approximate side-view template.

From operation 2002, the method proceeds operation 2003, which applies lens distortion adjustments.

Every lens causes an image to be distorted in certain ways. For example, a wide-angle lens may cause straight lines to become curve (e.g., barrel distortion or pincushion distortion). In order to remove any artifacts caused by the lens these distortions are removed from the side-view camera image. The focal length of the lens is used to remove the distortion, as known in the art. The system can keep a stock set of homographies used only for lens distortion. The focal length is just a mnemonic/key for a lookup to get the lens distortion homography to be applied.

From operation 2003, the method proceeds to operation 2004 which cleans up the image.

The area that was discarded in the approximate side-view is reused to discard the same area above the table's edge in the undistorted camera side-side view. The area discarded in the camera side-view will not be the exact area that would ideally need to be discarded, but because it's a close guess it works well enough From operation 2004, the method proceeds to operation 2005, which uses homography to rotate top-down regions to approximate the side view. This can be done as described herein, for example using the OpenCV function Perspective Transform. This is described in operations 912, 1102 with regard to the "simple" approach (which does not call operation 2000) which uses an OpenCV function such as PerspectiveTransform) to transform regions of interest in the top-down meta-data to regions of interest in the camera meta-data. This transformation is described in numerous places herein.

The same calculations used to take the top-down template image to the approximate side-view template are used to calculate the regions in the approximate side-view template.

From operation 2005, the method proceeds to operation 2006, which creates OPENCV feature matchers (ORB or AKAZE).

In order to align the approximate side-view (generated from the top-down view) with the undistorted camera view they need to be matches together and the best way of doing this is to compare features that appear in both images. To do this feature matching, characteristic points in each of the two images are identified and compared to one another. ORB and AKAZE are two known functions in OpenCV to do this.

From operation 2006, the method proceeds to operation 2007, which runs feature match.

The feature points extracted out of the camera image and the approximate side-view image are compared to one another and non-similar points will have to be filtered out.

From operation 2007, the method proceeds to operation 2008 which gets all angles between matched features.

The camera view and the approximate side-view are put side-by-side, and then lines are drawn between the matching points. Each line will be at a certain angle.

From operation 2008, the method proceeds to operation 2009, which removes invalid matched features based on angles and OPENCV methods.

In most cases this will result in fairly parallel lines, and when this is not the case the matching points should get filtered out. In a similar fashion outliers can be filtered out as well as feature points that are too far apart from one another.

From operation 2009, the method proceeds to connector C which then continues on FIG. 21.

FIG. 21 is a flowchart continuing the exemplary method of implementing a transformation to determine camera regions of interest, according to an embodiment.

From connector C, the method continues to operation 2100, which gets the homography from matched features.

Based on the filtered matching feature points it's possible to align the approximate side with the camera view, thereby creating a corrected approximate camera side-view (i.e., another better homography than the original one).

From operation 2100, the method proceeds to operation 2101, which calculates a score based on a delta of the area regions between original homography and feature matched homography.

When applying feature matching a scoring mechanism is used in order to determine if the matching was good or bad. Usually scores based on the featuring matching are used (e.g., the number of matching feature points), but in this situation good scores were acquired by comparing the surface areas of regions in the camera side-view to the surface areas of the regions in the approximate side-view.

From operation 2101, the method proceeds to operation 2102, which determines whether the score (computed in operation 2101) is too low.

If in operation 2102, it is determined that the score computed in operation 2102 is too low, then the method proceeds to operation 2103, which returns rotated regions based on the original homography. There is too little confidence to continue.

The feature matching process didn't succeed so stick with the best possible result, namely the regions derived from the approximate side-view template (from before the feature matching was applied). The method then proceeds to connector D (which continues in FIG. 22).

In operation 2102, it is determined that the score (computed in operation 2101) is not too low, then the method proceeds to operation 2104, which uses rotated regions based on feature matched homography.

Feature matching resulted in the approximate side-view template to be aligned with the camera side-view. The same calculation can then be used to calculate the region in the now aligned approximate side-view.

From operation 2104, the method proceeds to operation 2105 which runs feature match again.

Because the aligned approximate side-view is usually better than the original approximate side-view, it means that the system can reapply feature matching again as well as perform some additional fine-tuning by matching each region inside the images as well.

From operation 2105, the method proceeds to operation 2106, which performs image correction.

The aligned approximate side-view is better than the original approximate side-view. Because of this the to-be-discarded zone above the table's edge also more closely matches the actual side-view camera's to-be-discarded zone. Hence use this zone instead to discard the top area in both the camera side-view and in the aligned approximate side-view template. The approximate side-view is also quite sharp compared to the camera side-view and so it gets blurred in order to more closely match the images.

From operation 2106, the method proceeds to operation 2107, which fine tunes the regions using local feature matching.

Feature matching is used to align (an area around) each region in the camera side-view and the aligned side-view template.

From operation 2107, the method proceeds to operation 2108, which calculates a score as well for each region of interest (ROI).

A score is calculated based on the number of regions that have been reliably fine-tuned, where a region is considered reliably fine-tuned if the difference in surface area before and after local fine-tuning hasn't changed too much. As one example, starting with a list of contours (a list of points defining an area) before and after some operation. The OpenCV function CvInvoke.ContourArea calculates the area of a contour. The score for any given region/contour can be=(Min(beforeArea,afterArea)/Max(beforeArea,afterArea)). The overall score for the template and homography is the minimum score for all the regions detected. Any other method to determine a score rating a match/fit of a homography and template image to an image taken by a camera (camera view) can be used. Note the score computation in operation 2108 can be the same score computation as in computed in operation 2101.

From operation 2108, the method proceeds to connected E which continues on FIG. 22.

FIG. 22 is a flowchart completing the exemplary method of implementing a transformation to determine camera regions of interest, according to an embodiment.

From connector E, the method proceeds to operation 2200, which determines if the score (the overall score calculated in operation 2108) is acceptable. If more than a certain percentage of the regions have been reliably fine-tuned then the method proceeds to operation 2201, while otherwise the method proceeds to operation 2202.

In operation 2201, only fine-tuning of regions with a very score are kept. The other regions need to be aligned again since the local feature matching failed for those regions. In this case calculate a global alignment of the images using the fine-tuned regions that were successfully aligned. For each region that wasn't fine-tuned this global correction is used instead.

In operation 2202, the fine-tuning isn't reliable enough so the results from just before the fine-tuning process, i.e., the aligned approximate side-view template are returned. Note that in all cases, an optional lens distortion correction can be applied.

In 2203, the transformed regions are returned from this transformation process.

When starting with the initial "guess" homography to go from the top down to the side view the system obtains a final score after having applied all steps, where the score is readjusted depending on the outcome of each step. Multiple initial guesses for the camera positions can be tested, each resulting in a different score and finally the best score and match will be kept. Regions of interest can be defined in the top down image and the same homographies and image manipulations can be used to obtain the regions of interest in the final camera image.

Note that all camera meta-data (and the top-down meta-data, template images, etc.) can be stored anywhere on the system, such as the respective table computer, the respective casino server, the administrator server, or any combination of these computers. Live video streams from the cameras at the table can be transmitted to any of the computers on the system (e.g., the respective table computer, respective casino server, administrator server, etc.) and such live video can be stored in a database for later retrieval. The live video from the cameras can be analyzed (using the camera meta-data so that the regions of interest are identified) by any computer (e.g., the table computer, the casino server, the administrator) so analysis of the video can be completed. The analysis of the camera video can then be reflected on any of the computers, for example, the casino server would store (or be in communication with another database that stores) information about player bets so the bets that each player makes can be tracked and stored in the system. Information about player cheating, dealer cheating, dealer efficiency, etc., determined from analyzing the video streams as described herein can also be stored on any one (or any combination) of the computers (e.g., casino servers, administrator server, table computer, etc.) The system may know the identity of players sitting at particular locations on the table (by presenting their players card to a casino employee), and so the system can track the betting activity of those respective players by examining the chips placed in the respective betting regions. For example, from FIG. 8, is a particular player is sitting at location 1b, then a portion of an image (still or video) taken by a camera at the casino table can be analyzed in the region of interest for 1b as defined in the camera meta-data to determine how much in chips are placed there for each hand. This amount can be stored in a casino database, and thus the casino would know the amount this particular player has wagered (and the times wagered, his/her average bet, etc.) Thus, all wagers placed in all betting regions of interest can be identified and associated with particular players (since each particular player can be associated with his/her own betting area region of interest), and all of this data can be stored in a database.

Figure 23:
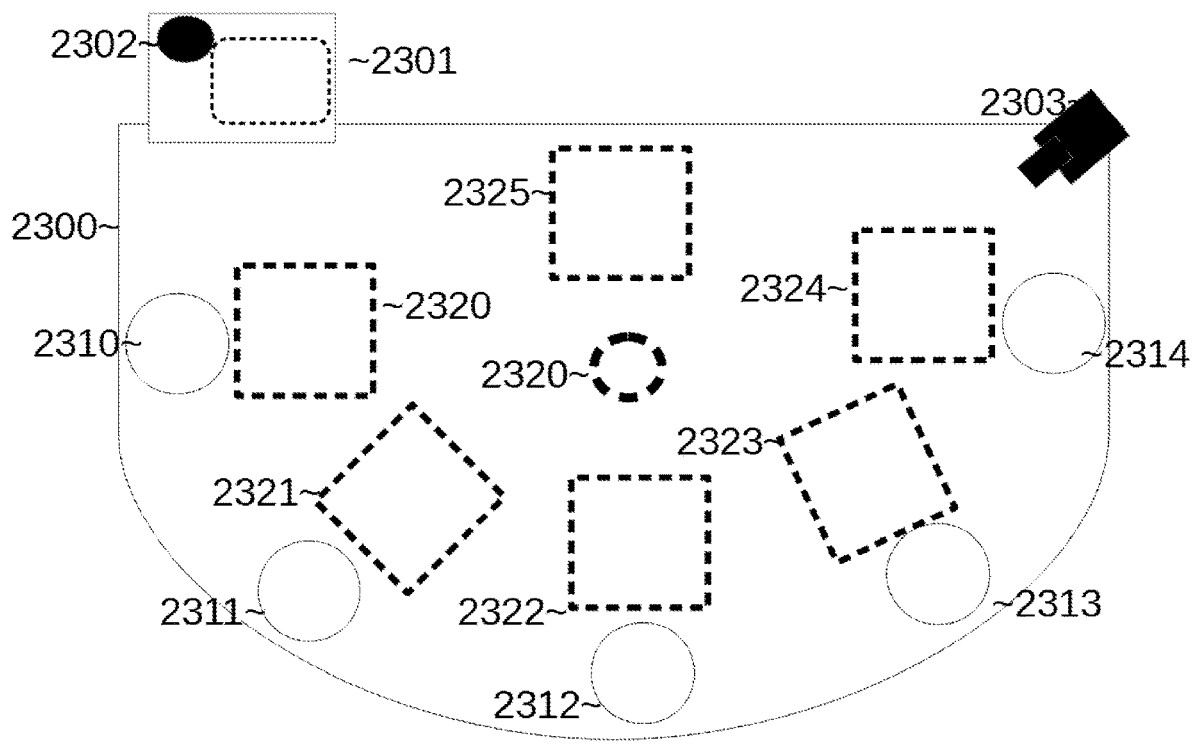
FIG. 23 is a drawing of a sample casino table with cameras, according to an embodiment.

FIG. 23 is a drawing of a sample casino table with cameras, according to an embodiment.

A casino table 2300 has a table sign 2301 which has a video display (front and back) which displays advertisements on the front (and the back can be used for input/output with the system). A left video camera 2302 (which can be embedded inside the sign 2301) and a right video camera 2303 are both at the casino table (mounted physically to the casino table or to a structure touching the casino table) pointed at the table and each camera can see all regions of interest. In another embodiment, not all cameras would see the entire table (and hence all of the regions of interest) but combining all cameras would yield views of all of the regions of interest. Regions of interest include betting circle 1 2310, betting circle 2, 2311, betting circle 3 2312, betting circle 4 2313, betting circle 5 2314, card region 1 2320, card region 2 2321, card region 3 2322, card region 4 2323, card region 5 2324, dealer card region 2325. The regions of interest can also be numbered in the reverse direction as well. This table can accommodate five players (although of course tables can accommodate other numbers of players) and each player has their own respective betting circle (which is a region of interest) and card region (which is a region of interest where that player's cards would be dealt). The dealer's card region 2325 would be where the dealer's cards would be dealt. For example, right camera 2303 could capture betting areas 2314, 2313, and 2312 (the other betting areas would not be in its field of view or too far out of the center of its view) while right left camera 2302 could capture betting areas 2310, 2311, and 2312 (the other betting areas would not be in its field of view of too far out of the center of its view). Betting area 2312 could be processed by either camera (or both). The regions of interest can be divided up among more than two cameras (e.g., 3-10), etc., including a camera on the ceiling (not shown in FIG. 23). In another embodiment, different cameras pointed on the same table can each individually capture all regions of interest on the table (as opposed to the other embodiment described where different cameras pointed on the same table cannot individually capture all regions of interest on the table but combined can capture all regions of interest on the table).

Note that while this table only has two cameras, any other number of cameras can be used on a table at the same time (e.g., one to five cameras or more). The more cameras, the better accuracy the system would have. Note that the associated hardware (such as a connected computer, etc.) can be implementing the methods described herein for each camera (e.g., would have its own training (e.g., FIGS. 10-11), its own homography, respective meta-data, etc.) Typically, the meta-data for the different cameras would still be stored in the same file (e.g., the camera meta-data) for simplicity.

Note that (optional) ceiling camera 2320 is present on the ceiling (directly over the table or not directly over the table but off to the side). The ceiling camera can be a security camera that already exists in the casino ceiling (e.g., the "sky") or a ceiling camera specifically installed to operate with the current system. The ceiling camera can be another camera that works with the system as any other camera (e.g., the right camera, the left camera, etc.) to provide another view to determine regions of interest. The ceiling camera is not at the casino table in that it is not physically connected (directly or indirectly) to the casino table but is mounted over the casino table.

Note that all cameras (regardless of how many cameras are pointed at a table) can be present inside/on signs at the table (e.g., a betting limit sign or other type of sign), or some camera(s) can be inside/on signs at the table while other camera(s) at the table are not inside/on signs. The system can also use one or more cameras that are external to the table (e.g., on the ceiling, etc.) alone or in combination with one or more cameras that are at the table itself. The processing (e.g., the image processing, etc.) can be done on a computer at the table or can be remotely (e.g., on a casino server, administrator server, etc.) In an embodiment, the system can also be administered using only overhead cameras (such as the security cameras that typically already exist in a casino).

Figure 24:
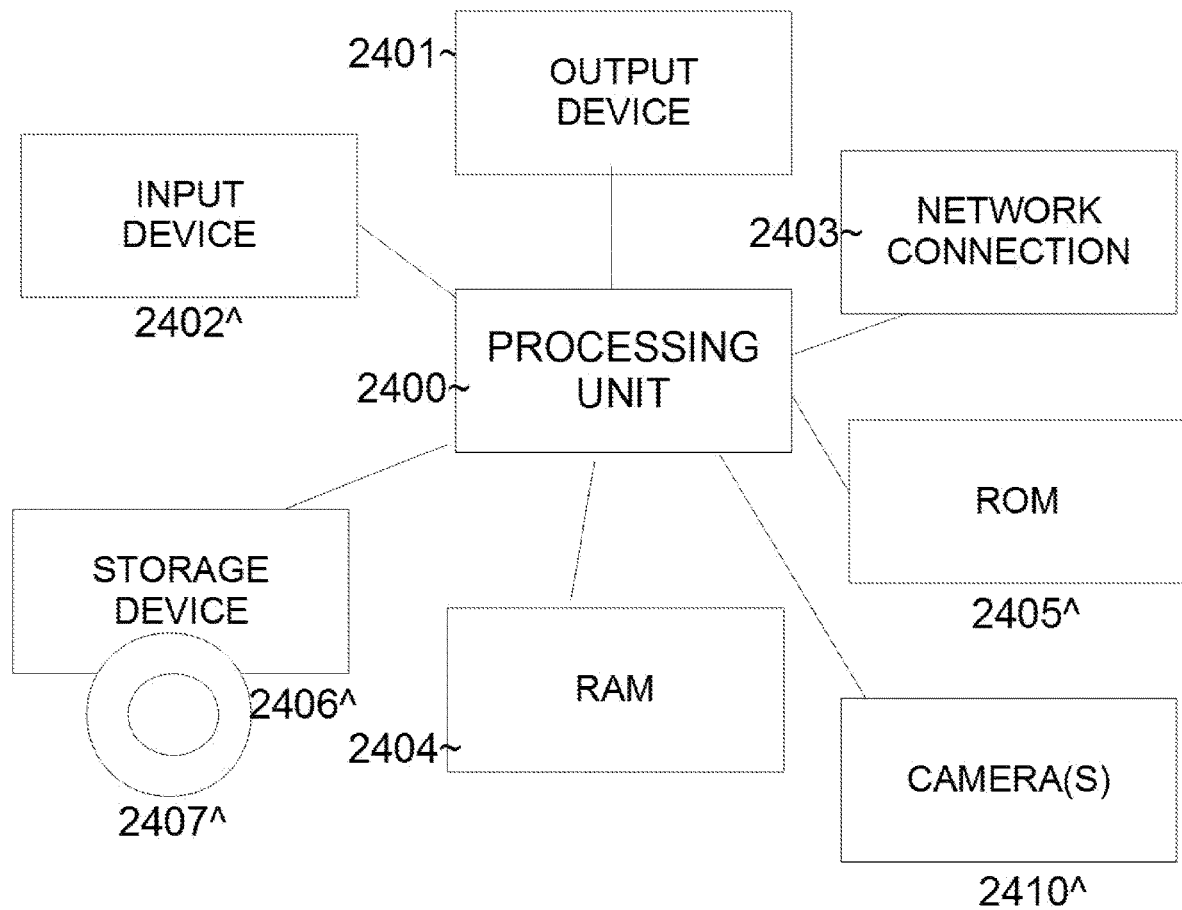
FIG. 24 is a block diagram illustrating a computer system which can implement all of the methods described herein, according to an embodiment.

FIG. 24 is a block diagram illustrating a computer system which can implement all of the methods described herein, according to an embodiment. The computer architecture illustrated in FIG. 24 can implement a computer running at the administrator's location, any server on the system, any computer/device of any kind operating at the casino table, etc.

A processing unit 2400 (such as a microprocessor and any associated components) is connected to an output device 2401 (such as an LCD monitor, touch screen, CRT, etc.) which is used to display to the player any aspect of the method, and an input device 2402 (e.g., buttons, a touch screen, a keyboard, mouse, etc.) which can be used to input any input (whether described herein or not) from the user/technician to effectuate the method. The output device 2401 can output any information, status, etc., of any aspect of the system (whether described herein or not). The input device 2402 and output device 2401 can be for example embedded into a table sign using a touch screen, or can be on a separate device. There can also be multiple output devices 2401 and input devices 2402 connected to the processing unit 2400. One example of a combined input device 2402/output device 2401 can be a table sign located at the table itself. All methods, features, embodiments, etc., described herein can be performed by the processing unit 2400 (or multiple such processing units) by loading and executing respective instructions. Multiple such processing units can also work in collaboration with each other (in a same or different physical location). The processing unit 2400 can also be connected to a network connection 2403, which can connect the device to a computer communications network such as the Internet, a LAN, WAN, etc. The processing unit 2400 can communicate with any other computer, device, server, etc., located in a same or different physical location via the network connection 2403. The processing unit 2400 is also connected to a RAM 2404 and a ROM 2405. The processing unit 2400 is also connected to a storage device 106 which can be a disk drive, DVD-drive, CD-ROM drive, flash memory, etc. A non-transitory computer readable storage medium 2407 (e.g., hard disk, CD-ROM, etc.), can store a program which can control the electronic device to perform any of the methods described herein and can be read by the storage device 2406.

Also connected to the processing unit 2400 is one or more cameras 2410 which can view an image (still or moving), digitize the image, and transmit the data representing the digitized image to the processing unit (or any other component) so it can be stored and/or analyzed. In another embodiment, the cameras might not be directly connected to the processing unit 2400 but can be connected via a network stream (e.g., wireless or wired network). In fact all components may either be directly connected to their connections or indirectly connected (e.g., via a wireless or wired network).

While one processing unit is shown, it can be appreciated that one or more such processor can work together (either in a same physical location or in different locations) to combine and communicate to implement any of the methods described herein. Programs and/or data required to implement any of the methods/features described herein can all be stored on any one or more non-transitory computer readable storage medium (volatile or non-volatile, such as CD-ROM, RAM, ROM, EPROM, microprocessor cache, etc.) Processes can be split up among different processors, for example, some processing can be done by table computer (e.g., table computer 2507), some by casino server (e.g., casino A server 2501), some by administrator server (e.g., administrator sever 2500), etc. All inputs (e.g., images and other inputs), can also be input (uploaded) at any processor on the system (e.g., table computer 2507), casino server (e.g., casino A server 2501), administrator server (e.g., administrator sever 2500), etc. The processing can be divided up among different processor in the system in any possible manner (e.g., image processing can be done by the table computer, casino server, administrator server, any other server/computer on the system, and using any combination of such processors). All processors on the system can communicate with each-other (directly or indirectly) by using any type of computer communications network (e.g., internet).

Figure 25:
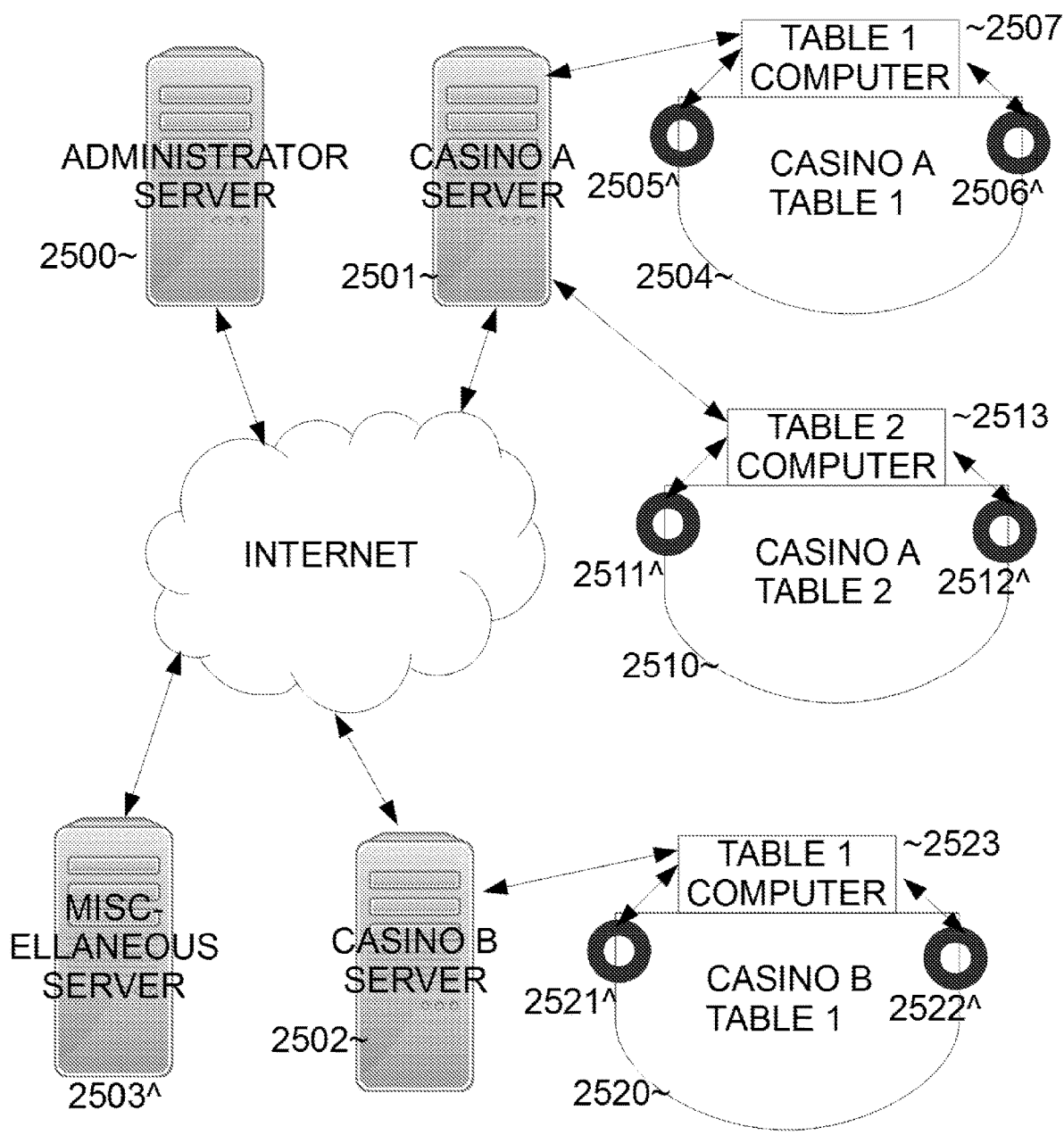
FIG. 25 is a block diagram illustrating a network showing how different components of the system can be interconnected, according to an embodiment.

FIG. 25 is a block diagram illustrating a network showing how different components of the system can be interconnected, according to an embodiment. Note that while "server" is used to refer to devices, these devices can be databases, personal computers, or any type of computer, which all are able to perform any computer functions needed. Each of these servers can exist as one machine or multiple machines in communication with each-other.

A miscellaneous server 2503 can be a source for original layouts, this can be a game developer, casino, game distributor, etc. The layouts can be distributed to an administrator server 2500 via email, web browser, etc. The administrator server 2500 is operated by the administrator of the entire system and performs operations such as receiving the layouts, generating and distributing the temple images and the top-down meta-data, and any other method/feature described herein. Administrator server 2500 can also be considered a cloud server which distributes the templates to casino servers (e.g., casino A server 2501 and casino B server 2502). Casino servers are operated by a particular casino (or casino group) and receive the template image(s) and top-down meta-date from the administrator server 2500. The casino servers can also periodically check the administrator server 2500 for updates to template images and top-down meta-data. The casino servers distribute the template images and top-down meta-data to the game tables (also referred to as tables) at their casino. For example, casino A server ("casino A" is a particular casino or casino group) distributes template images and top-down meta-data it receives to computers at casino A's tables which utilize the system (i.e., table 1 computer 2507 at casino A table 1 2504 and table 2 computer 2513 at casino A table 2 2510). These computers at the table are connected to the cameras at the respective table. For example, table 1 computer 2507 is connected to table 1 left camera 2505 and table 1 right camera 2506. Table 2 computer 2513 is connected to table 2 left camera 2511 and table 2 right camera 2512. The table computers (table 1 computer 2507 and table 2 computer 2513) are the computers the perform all of the image processing (although alternatively this can be done on any of the other computers on the system such as the casino server or the administrator server). Casino B is a different casino (or casino group) than casino A and has its own casino B server 2502. Casino B server 2502 communicates with all of the tables in casino B's casino which utilize the system. In this example, casino B server 2502 communications with table 1 computer 2523 which communicates with casino B table 1 left camera 2521 and casino B table 1 right camera 2522.

In a further embodiment, instead of using operations 1002-1008 to identify objects on the table to map to the top-down meta-data which is then used to determine the homography, a more user-friendly (requiring less operations by the user) method can be implemented in which pre-stored homographies are used. A plurality of pre-stored homographies are processed to determine which one has the best fit to the current table and the camera, and then that homography is used to generate the camera meta-data from the top-down meta-data. In an embodiment, cameras can be mounted on the same mounts at the same positions on different tables and pointing at the same angles. If these parameters (camera type/lens, position of camera(s), direction camera is pointing, etc.) remains the same, then a homography determined for this set of parameters may work for a different table as long as these parameters remain the same. Pre-stored templates are also used so that the system can also automatically detect which template image (and hence which layout) corresponds to the felt currently on the casino table (which then defines the particular game set up for play at the table).

Figure 26:
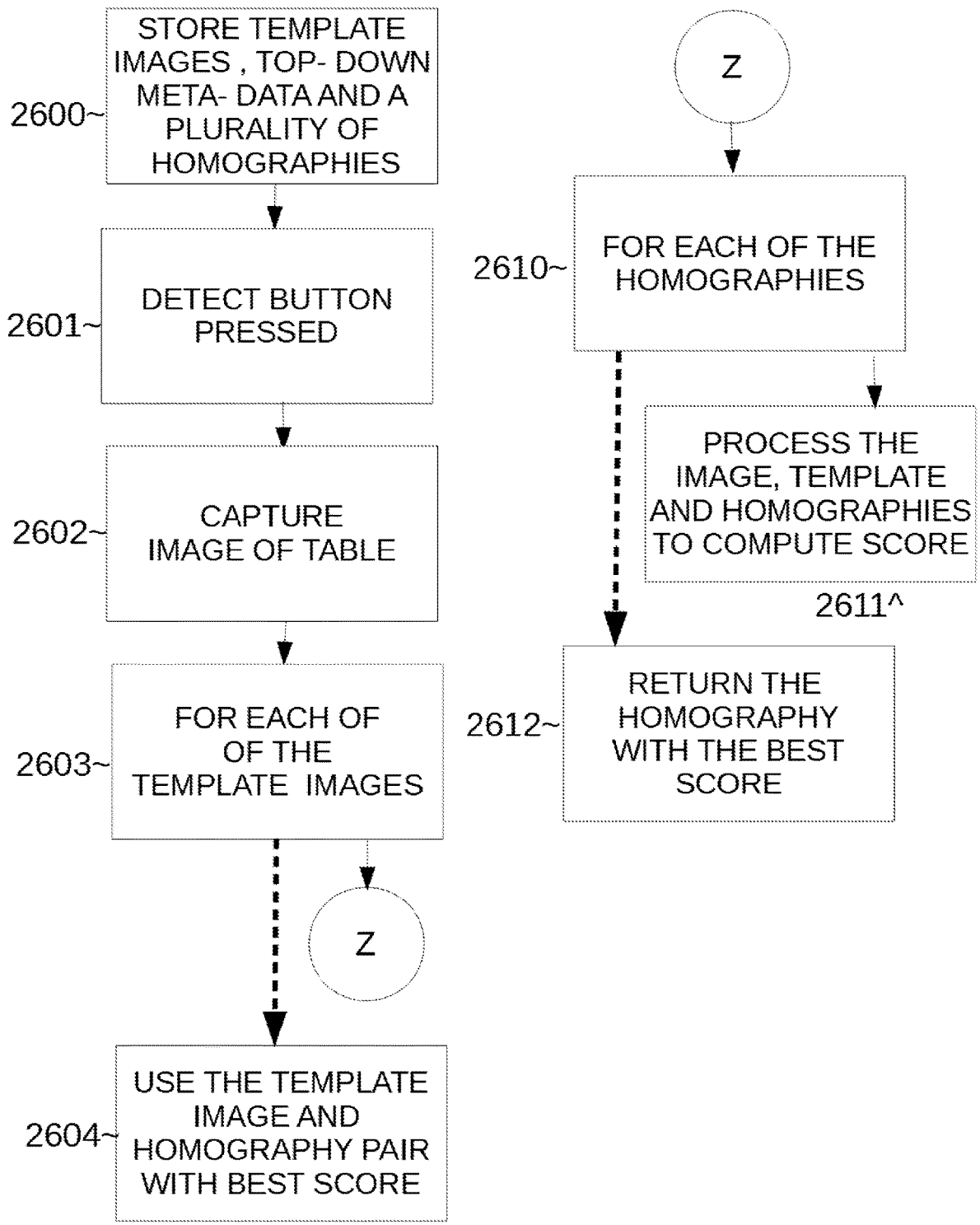
FIG. 26 is a flowchart illustrating an exemplary method of using pre-stored homographies to find a best match, according to an embodiment.

FIG. 26 is a flowchart illustrating an exemplary method of using pre-stored homographies to find a best match, according to an embodiment.

In operation 2600, template image(s), their respective top-down meta-data are stored on the system. These can be generated as described herein and can be stored anywhere on the system (e.g., the cloud, casino server, table computer, etc.) Also stored are a plurality of homographies. The plurality of homographies are ones that have been previously generated (as described herein) and are all stored. Typically, homographies that have worked very well should be included in the stored plurality of homographies.

From operation 2600, the method proceeds to operation 2601, wherein a detect button is pressed. The detect button can be virtual or real or any type of trigger in which a user (e.g., casino employee, technician, administrator, etc.) can initiate. The button/trigger can be located anywhere, such as on the table itself (e.g., on a table sign or on a computer at the table etc., or on a casino server or administrator server, etc.)

Note that operations 2602-2612 would be performed for each unique camera being used for the system at the casino table.

From operation 2601, the method proceeds to operation 2602, which captures an image of the casino table by the camera. The same image can be used for all of the further operations in FIG. 26 (but operations 2602-2612 are repeated for each different camera at the casino table in order to generate the camera meta-data for that camera for that casino table).

From operation 2602, the method proceeds to operation 2603, which initiates a loop for each of the template images stored from operation 2600. For each of the template images, connector Z is called (continues on the same page). Basically connector Z goes to an operation which loops through all of the homographies (stored in operation 2600) and processes them to find the homography (in conjunction with the current template image being passed in operation 2603) that has the best score. In other words, all pairs of template images and homographies are processed to determine their score, and the best score is used in operation 2604.

So after operation 2603 is completed, which means that for all of the stored template images a score is computed (in operation 2611) which represents the best (operation 2612) homography for each template, the method proceeds to operation 2604. In operation 2604, the best universal score is determined (best typically means higher) out of all of the returned scores (operation 2612). This best universal score represents the pair of homography and template image which has the best score (known as the winning template image and the winning homography). In other words, in operation 2612 the highest score is determined/return of all homographies for each template image, and operation 2604 determines the universal highest (winning) score out of each of those highest scores (from operation 2612). Thus, the highest score after all instances operation 2612 is executed wins and becomes the highest universal score which was generated from the winning template and the winning homography. The pair of template image and the homography that resulted in the best universal score is then used (known as the winning template image and the winning homography). The top-down meta-data for the winning template image (resulting in the best universal score) combined with the winning homography (resulting in the best universal score) are used to generate the camera meta-data. The camera meta-data is generated by using the top-down meta-data associated with the winning template image and using the winning homography as described herein.

In this manner, by simply pressing a detect button (operation 2601), the system can automatically identify the template (associated with the layout on the casino table), the homography, and hence automatically generate the camera meta-data.

In FIG. 26, from connector Z (on the right side of FIG. 26) the method continues to operation 2610 which initiates a loop for each of the homographies (stored in operation 2600). The loop performs operation 2611 for each of the homographies (stored in operation 2600).

In operation 2611, it processes the template image (passed in operation 2603), the camera image (captured in operation 2602), and all of the stored homographies (stored in operation 2600) to determine the score. The processing means calling operation 2000 (and hence executing the method illustrated in FIGS. 20-22) for each different homography stored (operation 2600) which is processed. When the method illustrated in FIGS. 20-22 is completed, a score is computed (e.g., in operation 2108 which is returned from the processing in operation 2203 back to operation 2611) which is a measure of how good the transformation is (e.g., a measure of how good the match is between the camera image and the template image based on the homography). The score (the overall score computed in operation 2108) which is used to determine the best match (the pair of winning homography and winning template image) can be computed by starting with a list of contours (a list of points defining an area) before and after some operation. The OpenCV function Cvinvoke.ContourArea calculates the area of a contour. The score for any given region/contour is=(Min(beforeArea,afterArea)/Max(beforeArea,afterArea)). The overall score for the template and homography is the minimum score for all the regions detected. Any other method to determine a score rating a match/fit of a homography and template image to an image taken by a camera (camera view) can also be used.

After all of the homographies (stored in operation 2600) have been processed in operation 2611 (e.g., a score has been computed for each), then the method proceeds from operation 2610 to operation 2612, which determines which out of all of the scores from operation 2611 for this particular template image is the best (typically highest). The homography with the best score is then identified and returned (along with the score) back to operation 2603. Thus, for the individual template image being passed (when connector Z is called), operation 2612 returns the best homography (out of all of the stored homographies stored in operation 2600) which works best for the current template image passed in operation 2603.

Thus, the general method in FIG. 26 tries all stored homographies with all stored template images to determine the score of respective pair. For example, if there are A stored template images and B stored homographies, then A*B scores would be computed, and the winning homography and the winning pair is the pair (of template image and homography) that has the best score out of all of the other pairs scored. This winning template image and winning homography can then be used by the rest of the system (as described herein) as the current template image and the current homography without regard to how they were actually determined.

Thus, by using pre-stored homographies then the implementation of the process can be simpler because there is no need to identify to the system the template corresponding to the table (layout), nor is there a need to place chips on the table (operation 1002). However, this method be may less accurate than the method illustrated in FIG. 10.

In another embodiment, instead of the system automatically determining the template (which corresponds to the layout on the casino table at the time), a casino employee can manually identify the layout/template image to the system by selecting the layout/template from a menu. In this embodiment, operation 2603 only needs to call connector Z for the selected template in order to find the winning homography.

Once the camera meta-data has been determined, then it can be used as described herein, to analyze images within the regions of interest defined by the camera meta-data to automatically identify cards, bets made, etc., in order to track and analyze progress of the game being played at the casino table.

Note that game rules can also be stored and associated with each template image. For example, blackjack games can have side bets with each side bet having a different layout (and hence corresponding template image). When an image template is identified using the method described herein, the associated rules with that game can be retrieved and displayed on a table sign (which can be an output device 2401). For example, a blackjack game with a side bet such as "stupendous queens" has a paytable (rule set) such as "1 queen pays 2:1; 2 queens pays 3:1, and 3+ queens pays 10:1" and another blackjack game with a side bet such as "crazy 3's" has a paytable (rule set) such as "three 3's pays 10:1 and 4 3's pays 100:1." The blackjack games can be identified by their unique layout (which is captured by the camera in operation 2602) and the corresponding template image is then identified in operation 2604. The associated rule set for that respective (identified) template image can then be displayed on an output device (such as a table sign) for the players to see. For example, if the system automatically recognizes the layout on the table as the "crazy 3's" game, then the particular rule set (e.g., three 3's pays 10:1 and 4 3's pays 100:1") can automatically be displayed on the table sign at the table (or another such output device).

Thus, the benefits of the inventive concepts herein are numerous. For example, when a template image is generated from a layout (which can be used as a table felt on a casino table), the regions of interest (where relevant activity occurs on the table) can be identified on the template image. One problem the present inventive concept solves is identifying where these same regions of interest (identified on the template and referred to as top-down meta-data) can be found on images taken by cameras at the table itself (each side cameras). The portions of the camera images which are the regions of interest can then be analyzed for relevant activity (e.g., to determine and track how much in chips players at different positions have bet, etc.) Software can be used to analyze an image of a stack of chips and determine how much in dollars the stack of chips is equivalent to (by recognizing each chip and its denomination by color).

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method for identifying a region of interest on a casino table, the method comprising:
   receiving top-down meta-data for the casino table, wherein the top-down meta-data defines a plurality of regions of interest of the casino table;
   capturing with a camera a table image of the casino table, wherein a gaming object is placed on the casino table in one of the plurality of regions of interest;
   based on the table image and top-down meta data, defining a homography between the top down meta-data and the table image for the one of the plurality of regions of interest based on the location of the gaming object in the region of interest;
   based on the homography, transforming each of the plurality of regions of interest in the top-down meta data to regions of interest in the table image; and
   generating camera meta-data for each of the plurality of transformed regions of interest.

2. The method as recited in claim 1, further comprising generating camera meta-data for each of a plurality of different cameras.

3. The method as recited in claim 2, wherein each of the plurality of different cameras have a different camera angle relative to the casino table.

4. The method as recited in claim 2, wherein a first camera of the plurality of different cameras is mounted on a pole proximate to the casino table.

5. The method as recited in claim 4, wherein a second camera of the plurality of different cameras is a ceiling-mounted camera.

6. The method as recited in claim 2, wherein each of the plurality of different cameras simultaneously capture images of the casino table.

7. The method as recited in claim 1, wherein the top-down meta-data for the casino table defines a shape for each of the plurality of regions of interest.

8. The method as recited in claim 1, wherein the casino table defines betting circles and each of the plurality of regions of interest corresponds with a respective betting circle.

9. The method as recited in claim 1, wherein the casino table defines a dice region and one of the plurality of regions of interest corresponds with the dice region.

10. The method as recited in claim 1, wherein the casino table defines a wheel region and one of the plurality of regions of interest corresponds with the wheel region.

11. The method as recited in claim 1, wherein the table image is a still image.

12. The method as recited in claim 1, wherein the table image is a video image.

13. An apparatus comprising an electronic processor connected to at least one non-transitory computer readable storage medium having instructions stored thereon which when executed by the processor cause the processor to:
    receive top-down meta-data for the casino table, wherein the top-down meta-data defines a plurality of regions of interest of the casino table;
    capture with a camera a table image of the casino table, wherein a gaming object is placed on the casino table in one of the plurality of regions of interest;
    based on the table image and the top-down meta data, define a homography between the top down meta-data and the table image for the one of the plurality of regions of interest based on the location of the gaming object in the region of interest;
    based on the homography, transform each of the plurality of regions of interest in the top-down meta data to regions of interest in the table image; and
    generate camera meta-data for each of the plurality of transformed regions of interest.

14. The apparatus as recited in claim 13, further comprising instructions which when executed by a processor cause the processor to:
    generate camera meta-data for each of a plurality of different cameras.

15. The apparatus as recited in claim 14, wherein each of the plurality of different cameras simultaneously capture images of the casino table.

16. The apparatus as recited in claim 14, wherein each of the plurality of different cameras have a different camera angle relative to the casino table.

17. The apparatus as recited in claim 14, wherein a first camera of the plurality of different cameras is mounted on a pole proximate to the casino table.

18. The apparatus as recited in claim 17, wherein a second camera of the plurality of different cameras is a ceiling-mounted camera.

19. The apparatus as recited in claim 13, wherein the any of the plurality of regions of interest corresponds with any of a betting circle, a dice region, and a wheel region.

20. The apparatus as recited in claim 13, wherein the table image is any of a still image and a video image.

* * * * *